(12) United States Patent
Mori et al.

(10) Patent No.: US 7,275,986 B2
(45) Date of Patent: Oct. 2, 2007

(54) METHOD FOR PERFORMING GAME, INFORMATION STORAGE MEDIUM, GAME DEVICE, DATA SIGNAL AND PROGRAM

(75) Inventors: Tomohiro Mori, Nerima-ku (JP); Takahiro Fukuda, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 744 days.

(21) Appl. No.: 10/800,756

(22) Filed: Mar. 16, 2004

(65) Prior Publication Data

US 2004/0192424 A1    Sep. 30, 2004

(30) Foreign Application Priority Data

Mar. 24, 2003    (JP)    ............................. 2003-079906

(51) Int. Cl.
  *A63F 9/24*    (2006.01)
(52) U.S. Cl. ................................. 463/8; 463/2; 463/30
(58) Field of Classification Search ..................... None
  See application file for complete search history.

(56) References Cited

U.S. PATENT DOCUMENTS 4,850,591 A * 7/1989 Takezawa et al. ............ 463/37
6,379,249 B1 * 4/2002 Satsukawa et al. ........... 463/31
6,623,358 B2 * 9/2003 Harima ........................ 463/31
2004/0259615 A1 * 12/2004 Mori et al. .................... 463/3

FOREIGN PATENT DOCUMENTS

JP    A 7-328228    12/1995

OTHER PUBLICATIONS

"Dengeki Play Station, Aug. 30/Sep. 2002 Double Issue (Silent Scope 3)," 2002, MediaWorks Co., Ltd., vol. 8, No. 18, p. 174.
Dengeki Pay Station, Sep. 27, 2002 (Silent Scope 3), 2002, MediaWorks Co., Ltd., vol. 8, No. 21, p. 193.

* cited by examiner

*Primary Examiner*—Mark Sager
(74) *Attorney, Agent, or Firm*—Oliff & Berridge, PLC

(57) ABSTRACT

A game performing method for making a computer device execute a predetermined game by generating a first object and a second object as seen from a virtual camera, has: judging whether there is a hit between the first object and the second object; judging whether a predetermined event occurrence condition is satisfied if it is judged that there is the hit between the first object and the second object; generating a first image which is an internal structure object of the second object if it is judged that the predetermined event occurrence condition is satisfied; and generating a second image which is the internal structure object with a predetermined part thereof changed after the first image is generated.

20 Claims, 32 Drawing Sheets

M1

M2

| MOTION FRAME NUMBER | JOINT POSITIONS | | |
|---|---|---|---|
| | head1 | neck1 | ... |
| 1 | (Xh1,Yh1,Zh1) | (Xn1,Yn1,Zn1) | ... |
| 2 | (Xh2,Yh2,Zh2) | (Xn2,Yn2,Zn2) | ... |
| 3 | (Xh3,Yh3,Zh3) | (Xn3,Yn3,Zn3) | ... |
| ⋮ | ⋮ | ⋮ | ... |

FIG.5

| CUT NUMBER | CAMERA | OBJECT | TRANSIENT CAMERAWORK |
|---|---|---|---|
| 1 | NORMAL CAMERA C1 | 1. PLAYER CHARACTER<br>2. ENEMY CHARACTER<br>    (NORMAL MODEL M1)<br>3. BACKGROUND | 1. ZOOMING IN<br>2. FADING OUT<br>   TO WHITE<br>   (0%→100%) |
| 2 | EFFECT CAMERA C2 | 1. ENEMY CHARACTER<br>    (NORMAL MODEL M1)<br>2. BACKGROUND | 1. ZOOMING IN<br>2. DISSOLVING |
| 3 | EFFECT CAMERA C3 | 1. ENEMY CHARACTER<br>    (NORMAL MODEL M1)<br>2. BACKGROUND | |
| 4 | EFFECT CAMERA C3 | 1. ENEMY CHARACTER<br>(INTERNAL STRUCTURE MODEL M2) | OVERLAYING TEXTURE |
| 5 | EFFECT CAMERA C3 | 1. ENEMY CHARACTER<br>(INTERNAL STRUCTURE MODEL M2) | 1. ZOOMING OUT<br>2. DISSOLVING |
| 6 | EFFECT CAMERA C2 | 1. ENEMY CHARACTER<br>    (NORMAL MODEL M1)<br>2. BACKGROUND | |

FIG. 8

EFFECT SETTING INFORMATION

| APPLYING EVENT TYPE | KICK |
|---|---|

| CUT NUMBER | DRAWING FRAME NUMBER | FILMING CONTENTS | | | TRANSIENT PROCESS CONTENTS | |
|---|---|---|---|---|---|---|
| | | CAMERA | OBJECT | FIELD ANGLE SETTING | TRANSIENT PROCESS TYPE | APPLYING FRAME NUMBER |
| 1 | 0~90 f | NORMAL CAMERA C1 | 1. PLAYER CHARACTER 2. ENEMY CHARACTER (NORMAL MODEL M1) 3. BACKGROUND | 1x→2x | FADING OUT TO WHITE (0%→100%) | 30~90 f |
| 2 | 91~150 f | EFFECT CAMERA C2 | 1. ENEMY CHARACTER (NORMAL MODEL M1) 2. BACKGROUND | | ZOOMING IN (1x→1.2x) DISSOLVING | 91~150 f |
| 3 | | EFFECT CAMERA C3 | 1. ENEMY CHARACTER (NORMAL MODEL M1) 2. BACKGROUND | | | |
| 4 | 151~240 f | EFFECT CAMERA C3 | 1. ENEMY CHARACTER (INTERNAL STRUCTURE MODEL M2) | 1.2X | OVERLAYING TEXTURE | 181~240 f |
| 5 | 241~300f | EFFECT CAMERA C3 | 1. ENEMY CHARACTER (INTERNAL STRUCTURE MODEL M2) | | ZOOMING OUT (1.2x→1x) DISSOLVING | 241~300 f |
| 6 | | EFFECT CAMERA C2 | 1. ENEMY CHARACTER (NORMAL MODEL M1) 2. BACKGROUND | | | |

*FIG.13A*
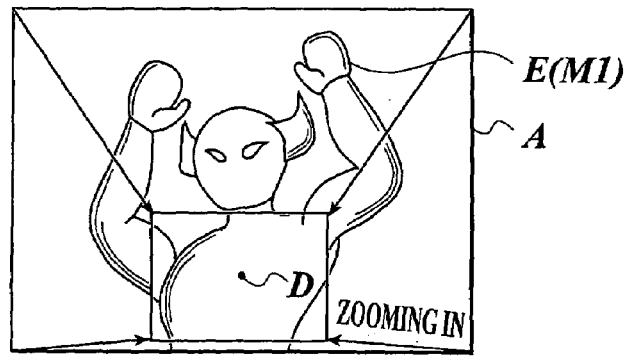
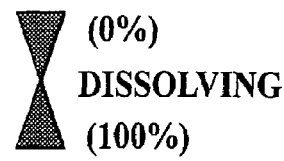
*FIG.13B*
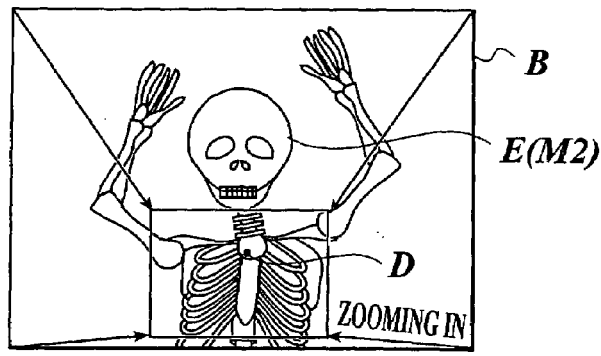
*FIG.13C*
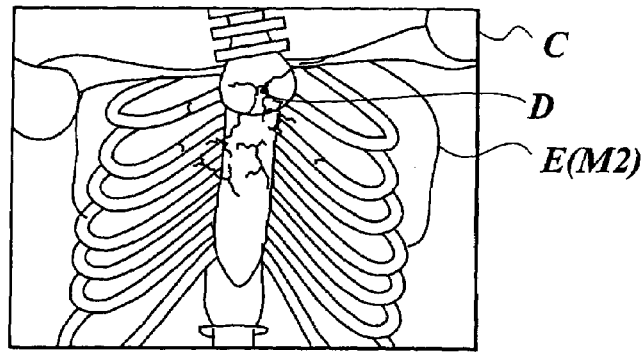

*FIG.14A*
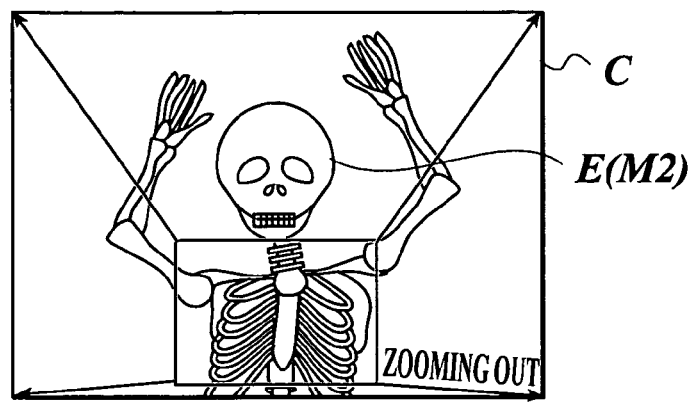
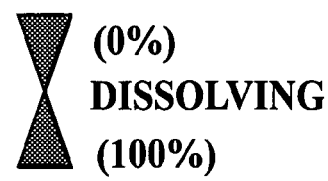
*FIG.14B*
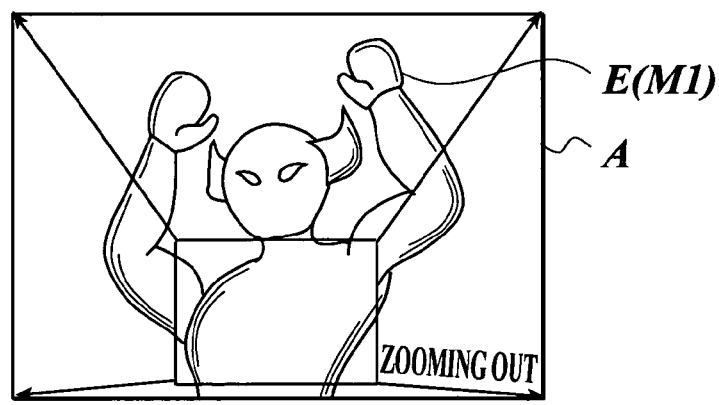
*FIG.14C*
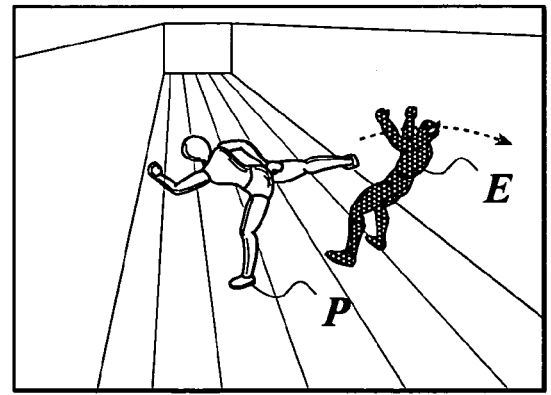

FIG. 18

| EFFECT SETTING INFORMATION | | | | | |
|---|---|---|---|---|---|
| APPLYING EVENT TYPE | KICK | | | | |

| | | FILMING CONTENTS | | TRANSIENT PROCESS CONTENTS | |
|---|---|---|---|---|---|
| CUT NUMBER | DRAWING FRAME NUMBER | CAMERA | OBJECT | FIELD ANGLE SETTING | TRANSIENT PROCESS TYPE | APPLYING FRAME NUMBER |
| 1 | 0~90 f | NORMAL CAMERA C1 | 1. PLAYER CHARACTER<br>2. ENEMY CHARACTER (NORMAL MODEL M1)<br>3. BACKGROUND | 1X→2X | FADING OUT TO WHITE (0%→100%) | 30~90 f |
| 2 | 91~150 f | EFFECT CAMERA C2 | 1. ENEMY CHARACTER (NORMAL MODEL M1)<br>2. BACKGROUND | 1X→1.2X | DISSOLVING | 91~150 f |
| 3 | 151~240 f | EFFECT CAMERA C3 | 1. ENEMY CHARACTER (NORMAL MODEL M1)<br>2. BACKGROUND | 1.2X | OVERLAYING TEXTURE | 181~240 f |
| 4 | 151~240 f | EFFECT CAMERA C3 | 1. ENEMY CHARACTER (INTERNAL STRUCTURE MODEL M2) | | | |
| 5 | 241~300f | EFFECT CAMERA C3 | 1. ENEMY CHARACTER (INTERNAL STRUCTURE MODEL M2) | | | |
| 6 | 241~300f | EFFECT CAMERA C2 | 1. ENEMY CHARACTER (NORMAL MODEL M1)<br>2. BACKGROUND | 1.2X→1X | DISSOLVING | 241~300 f |

FIG.27

EFFECT SETTING INFORMATION 733

| APPLYING EVENT TYPE | DEAD BALL |
|---|---|

733a

| | | FILMING CONTENTS | | | TRANSIENT PROCESS CONTENTS | |
|---|---|---|---|---|---|---|
| CUT NUMBER | DRAWING FRAME NUMBER | CAMERA | OBJECT | FIELD ANGLE SETTING | TRANSIENT PROCESS TYPE | APPLYING FRAME NUMBER |
| 1 | 0~90 f | NORMAL CAMERA C1 | 1. PITCHER CHARACTER<br>2. BATTER CHARACTER (NORMAL MODEL M1)<br>3. BACKGROUND | 1X→4X | FADING OUT TO WHITE (0%→100%) | 30~90 f |
| 2 | 91~150 f | NORMAL CAMERA C1 | 1. BATTER CHARACTER (NORMAL MODEL M1)<br>2. BACKGROUND | 4X→4.2X | DISSOLVING | 91~150 f |
| 3 | 151~240 f | NORMAL CAMERA C1 | 1. BATTER CHARACTER (NORMAL MODEL M1)<br>2. BACKGROUND | | | |
| 4 | 151~240 f | NORMAL CAMERA C1 | 1. BATTER CHARACTER (INTERNAL STRUCTURE MODEL M2) | 4.2X | 1. OVERLAYING TEXTURE<br>2. SCREEN SHAKING | 181~240 f |
| 5 | 241~380 f | NORMAL CAMERA C1 | 1. BATTER CHARACTER (INTERNAL STRUCTURE MODEL M2)<br>2. DRAMATIZING PRESENTATION OBJECT | 4.2X | NORMAL SYNTHESIS | 241~380 f |
| 6 | | NORMAL CAMERA C1 | 1. BATTER CHARACTER (INTERNAL STRUCTURE MODEL M2) | | | |
| 7 | 381~440 f | NORMAL CAMERA C1 | 1. BATTER CHARACTER (NORMAL MODEL M1)<br>2. BACKGROUND | 4.2X→4X | DISSOLVING | 381~440 f |

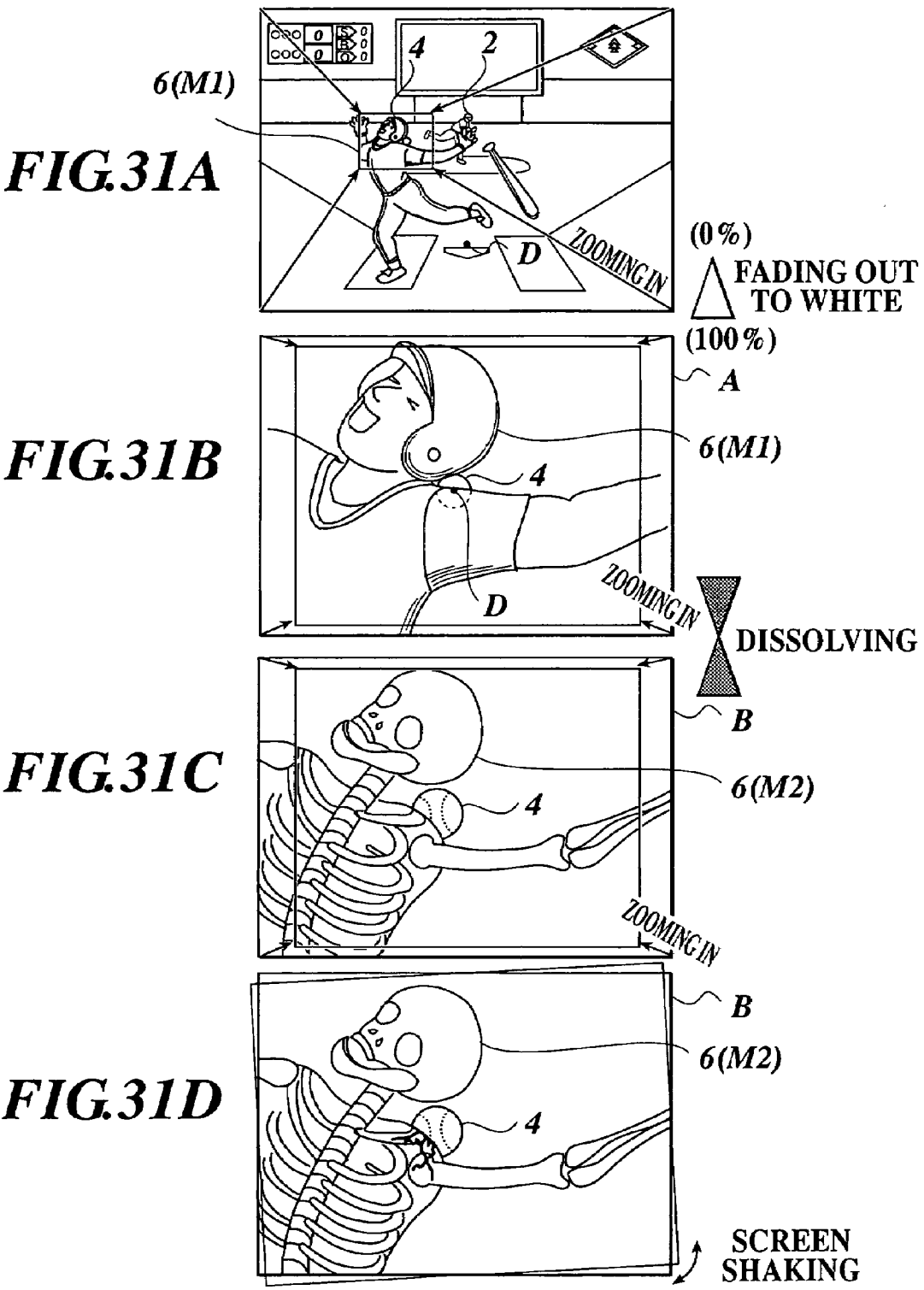

METHOD FOR PERFORMING GAME, INFORMATION STORAGE MEDIUM, GAME DEVICE, DATA SIGNAL AND PROGRAM

BACKGROUND OF THE INVENTION

1. Field of the Invention

The present invention relates to a method for performing a game, an information storage medium, a game device, a data signal and a program for executing a game by generating images of a first character and a second character fighting on a device such as a computer.

2. Description of the Related Art

In an action game or the like where a player character operated by a player fights another character, an effect expressed when an attack hits an opponent is an important element for arousing amusingness in the game. For example, in an action game with a martial arts theme, when a fighting technique of the player character hits the enemy character, rather than simply showing the reaction of the enemy character such as staggering backwards, a feeling of danger or forcefulness can be evoked from the game screen by adding visual effects such as blur effects or lightning flashes to express impacts or fragments flying through the air.

The blur effect for example, is a process for showing a display equivalent to the residual image or blur of the object image along the trail that the object has moved. A viewer therefore has the impression that the object is moving at high speed. A method is known in the related art for example for establishing a display position on the opposite side (rearward) that the character (object) is moving, placing multiple residual image data with shape identical to the character and then synthesizing so that the background image data becomes transparent (see for example, Japanese Patent Application Publication (Unexamined) No. Tokukai-Hei 07-328228; corresponding to all claims).

If the blur effect can be applied to the enemy character receiving a blow in a martial arts game, showing the enemy character being blown away at high speed, then the blow or fighting technique of the player character can be expressed with overwhelming power.

Expressing these effects such as the blur effect in the related art involves applying an expression object externally to the object needing the effect. The range of expressing the effect is limited to the external side of the object that can normally be seen from the outside. However, the damage sustained from an attack is not limited to only externally viewable sections and may for example be internal damage such as a bone fracture or a rupture of internal organ. Internal damage more closely resembles the actual sensation of pain than does external damage, and the mental impression rendered to the player has a much greater effect. However, there is no effective method in action games for rendering effects that express such internal damage.

Methods are contrived for rendering effects expressing internal damage by showing them on the outer side of the object. However, these methods have the problem that internal damage cannot be distinguished from external damage. Furthermore, simple ways of showing internal damage have little visual impact and fail to absorb much viewer interest.

SUMMARY OF THE INVENTION

In view of the problems with the related art, the present invention has the object of providing a method for performing a game, an information storage medium, a game device, a data signal and a program capable of expressing the effect of internal damage that occurred within the object. Another object of the invention is to express the interior of the object naturally without an unnatural sensation.

In accordance with a first aspect of the present invention, a game performing method for making a computer device execute a predetermined game by generating a first object and a second object as seen from a virtual camera, comprises: judging whether there is a hit between the first object and the second object; judging whether a predetermined event occurrence condition is satisfied if it is judged that there is the hit between the first object and the second object; generating a first image which is an internal structure object of the second object if it is judged that the predetermined event occurrence condition is satisfied; and generating a second image which is the internal structure object with a predetermined part thereof changed after the first image is generated.

In accordance with a second aspect of the present invention, a game device for executing a predetermined game by generating an image of a first object and an image of a second object as seen from a virtual camera, comprises: an hitting judgment section for judging whether there is a hit between the first object and the second object; an event judgment section for judging whether a predetermined event occurrence condition is satisfied if the hitting judgment section judges that there is the hit; and an internal structure image generating section for generating a first image which is an internal structure object of the second object if the event judgment section judges that the predetermined event occurrence condition is satisfied, and for generating a second image which is the internal structure object with a predetermined part thereof changed after the first image is generated.

According to the method of the first aspect and the device of the second aspect of the present invention, when the first object and the second object hit, it is possible to generate an image having the internal structure object changed due to the hit. In other words, when two objects hit in a game screen, the image of the internal structure is displayed, and it is possible to display the image with the internal structure changed (for example, breaking, bending, cracking, color-changing, shape-changing). Therefore, it is possible to express internal damage originated to the hit.

Preferably, the method of the first aspect of the present invention further comprises: determining a hitting location between the first object and the second object; and setting the virtual camera so as to make a field angle thereof include the determined hitting location if it is judged that the predetermined event occurrence condition is satisfied, wherein the generating the first image includes generating the first image which is the internal structure object of the second object based on the set virtual camera; and the generating the second image includes generating the second image which is the internal structure object with the predetermined part thereof According to the above-mentioned method, by setting a virtual camera so as to make a field angle include the hitting location between the first object and the second object, based on the set virtual camera, it is possible to display an image which is the internal structure object of the second object and an image in which a predetermined part of the internal structure object is being changed. In other words, when two objects hit on a game screen, an image of the internal structure including the hitting location and around the hitting location is displayed, and it is possible to display the image with the internal structure changed (for example, breaking, bending, cracking, color-changing, shape-changing).

In addition, within the equivalent range, a new virtual camera may be additionally set. In this case, if it is judged that the predetermined event occurrence condition is satisfied, the viewpoint is switched to the set new virtual camera. Then, the first image which is the internal structure object of the second object is generated, and thereafter, the second image of the internal structure object with a predetermined part changed is generated.

Preferably, the method of the first aspect of the present invention further comprises: making the computer device function for generating an image of the second object as seen from the set virtual camera, wherein the generating the first image and the generating the second image include generating sequentially the first image and the second image after the image of the second object is generated.

According to the above-mentioned method, it is possible to set a position of the virtual camera and a view line direction so as to film the hitting location from a side of the first object. In other words, it is possible to generate an image which is the internal structure object and an image of the internal structure being changed from a viewpoint of a direction in which the second object suffers an external force. Therefore, it is possible to achieve an expression with stronger impression.

In addition, at the pre-step of generating an image of the internal structure object, it is possible to generate an image of an external view of the second object as seen from the virtual camera set so as to make the field angle include the hitting location. Thereby, since the image of the internal structure is displayed after the image of the external view of the hitting location is once displayed, it is easy for a player to comprehend a screen association and a location relation.

Preferably, in the method of the first aspect of the present invention, the generating the first image and the generating the second image include generating the first image and the second image each having the internal structure object with a posture that is the same as a posture in the second object when the image of the second object is generated.

According to the above-mentioned method, it is possible to display an image so as to make it easily to comprehend a location relation of the internal structure object more clearly.

Preferably, in the method of the first aspect of the present invention, the generating the first image and the generating the second image include generating the first image and second image by making an image of a predetermined part out of the generated image of the second object become a part in the internal structure object, the part corresponding to the predetermined part.

According to the above-mentioned method, it is possible to display the first image and the second image limitedly in a predetermined part out of the generated image of the second object. Therefore, it is possible to show the first image and the second image as if viewing through a part of the second object limitedly, and thereby it is possible to directly impress the internal damage of the second object.

Preferably, in the method of the first aspect of the present invention, the predetermined part includes a predetermined range from the hitting location.

Preferably, in the method of the first aspect of the present invention, the generating the image of the second object includes generating the image of the second object so as to gradually increase transparency of the second object; the generating the first image includes generating the first image so as to gradually decrease transparency of the internal structure object from a first transparency degree; and the making the computer device function includes making the computer device function for controlling to switch to the generated first image while overlapping the first image on the image of the second object.

According to the above-mentioned method, it is possible to smoothly switch from a screen where the external view of the second object is filmed to a screen where the internal structure is filmed. Thereby, it is possible to give a player the sensation that the interior of the second object is gradually viewed through and the sensation that the camera is diving into the interior of the second object.

Preferably, the method of the first aspect of the present invention further comprises making the computer device function for generating an image of the second object having a posture that is the same as a posture in the internal structure object at completion of generating the first image and the second image, as seen from the set virtual camera.

According to the above-mentioned method, it is possible to smoothly switch an image of the internal structure object of the second object to a normal game screen where the external view of the second object is seen.

Preferably, in the method of the first aspect of the present invention, the generating the second image includes generating the second image so as to gradually increase transparency of the internal structure object; the generating the image of the second object includes generating the image of the second object so as to gradually decrease transparency of the second object from a second transparency degree; and the making the computer device function includes making the computer device function for controlling to switch to the generated image of the second object while overlapping the image of the second object on the second image.

According to the above-mentioned method, it is possible to more smoothly switch the screens.

Preferably, in the method of the first aspect of the present invention, the making the computer device function includes making the computer device function for controlling to generate an image while applying a single color display effect for gradually changing the entire image into a single color.

As the single display effect, for example, fading-out to white and a fading-out correspond thereto. However, a color to be made single can be suitably set according to a dramatizing purpose.

According to the above-mentioned method, it is possible to indicate that an image or a viewpoint has been switched. Further, it is possible to provide an impression corresponding to a color of the single color, for example in the case of fading-out to white, it is possible to switch the screen with supersensational impact.

Preferably, the method of the first aspect of the present invention further comprises making the computer device function for determining a hitting location between the first object and the second object and for generating an image with a zoom-up applied on, the zoom-up being made so as to bring the virtual camera close to the determined hitting location, if it is judged that the predetermined event occurrence condition is satisfied.

According to the above-mentioned method, it is possible to draw a visual line of the player to the hitting location between the first object and the second object to indicate the location in which the internal structure of the second object is to be changed, and to enhance an impression from an image (the second image) in which the internal structure is changed consecutively. Further, it is possible to provide the player the sensation that the camera is diving into the interior of the second object.

Preferably, the method of the first aspect of the present invention further comprises making the computer device function for generating an image with a screen shaken when the second image is generated.

According to the above-mentioned method, it is possible to effectively express the intensity of the hit in the entire screen. Here, shaking screen means a process called a screen shaking effect and an effect process simulating a shaken state due to the hit or simulating a shaken state as if from a handheld camera to express on the screen. For example, the screen shaking effect is achieved by a method of making the viewpoint posture or field angle vary with tiny movements, or a method of giving a blurring effect to the image and repeatedly enlarging/reducing the image.

Preferably, the method of the first aspect of the present invention further comprises making the computer device function for adding a text or a dramatizing presentation object on the second image.

According to the above-mentioned method, it is possible to further add a dramatizing element to the second image. For example, as the text, if a dialogue explaining the feeling of the second object or a comment ironizing the situation is displayed with a dramatizing presentation object in a word balloon of a comic or the like, it is possible to add a comical element to the impression of the internal damage. Further, if the hitting location is surrounded at pinpoint by the marker-like dramatizing presentation object, it is possible to emphasize the importance of the hitting location.

Preferably, the method of the first aspect of the present invention further comprises making the computer device function for controlling to display a replay screen, wherein the predetermined event occurrence condition includes that the displaying the replay screen is controlled.

Preferably, the method of the first aspect of the present invention further comprises: making the computer device function for pausing a motion of the first object and a motion of the second object if it is judged that the predetermined event occurrence condition is satisfied;

wherein the generating the first image and the generating second image include generating the first image and the second image after the motion of the first object and the motion of the second object are paused; and after the first image and the second image are generated, the computer device is made to function for resuming the motion of the first object and the motion of the second object that are paused.

According to the above-mentioned method, by pausing the motions of the first object and the second object until the first image and the second image of the internal structure object are displayed, it is possible to show the first image and the second image of the internal structure object as if it were an instant incident due to the hit.

Preferably, the method of the first aspect of the present invention further comprises making the computer device function for switching to the generated first image while applying a single color effect for gradually making an entire image into a single color, the entire image of the first object and the second object whose motions are paused.

According to the above-mentioned method, it is possible to indicate that an image or a viewpoint has been switched. Further, it is possible to provide an impression corresponding to a color of the single color, for example, it is possible to switch the screen with impact.

In accordance with a third aspect of the present invention, an information storage medium readable by a computer device, storing the method of the first aspect.

As the information storage medium, various types of IC memory, CD-ROM, DVD, MO, memory card, memory cassette, hard disk and the like correspond thereto. By making the computer device read a group of control information to perform calculation processes, it is possible to achieve the above-mentioned effects.

In accordance with a fourth aspect of the present invention, a data signal embodied in a carrier wave, comprising information used for executing the method of the first aspect.

In accordance with a fifth aspect of the present invention, a program, when the program is loaded onto an operating device, the program making the operating device execute the method of the first aspect.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 5 is a drawing showing typical settings for the X-ray effect process;

FIG. 8 is a view showing effect setting information in the first embodiment;

FIGS. 13A, 13B and 13C are views continued from FIGS. 12A, 12B and 12C showing an example of the screen display sequence of X-ray effect process in the displaying order in the first embodiment;

FIGS. 14A, 14B and 14C are views continued from FIGS. 13A, 13B and 13C showing an example of the screen display sequence of X-ray effect process in the displaying order in the first embodiment;

FIG. 18 is a view showing one example of effect setting information in the second embodiment;

FIG. 27 is a view showing one example of effect setting information corresponding to a dead ball in the fourth embodiment;

FIGS. 31A, 31B, 31C and 31D are views showing one example of a screen display sequence according to the X-ray effect process in the displaying order in the fourth embodiment.

PREFERRED EMBODIMENTS OF THE INVENTION

First Embodiment

An application of the present invention in a first embodiment to martial arts action games is described using examples in a hit between a first object and a second object, when a player character operated by a player hits an enemy character with a kick hit technique while referring to FIG. 1 through FIG. 16. The present invention is not limited to such application and may also be applied, for example, to a hit with items such as sticks or punches and shooting with guns, etc.

[Description of Configuration]

Figure 1:
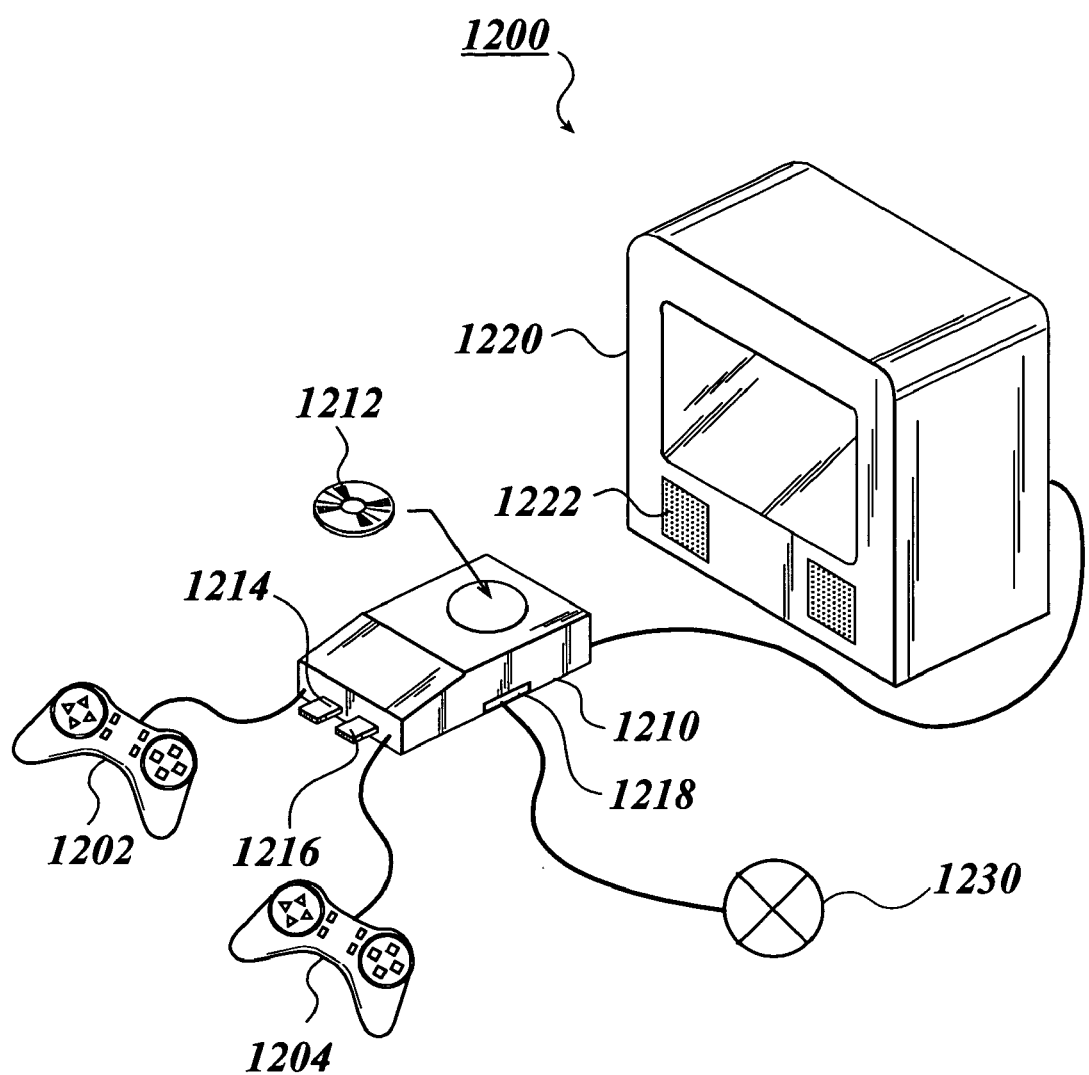
FIG. 1 is a drawing showing one example structure of the present invention when applied to a home game unit.

FIG. 1 shows an example of a home game unit to which the present invention is applied. As shown in FIG. 1, the home game unit 1200 has a main unit 1210 and game controllers 1202 and 1204, and is connected to a display 1222 equipped with a speaker 1222.

Game information required to execute the game, such as a game program and initial setting data, is stored in the information storage medium detachable from the main unit 1210, for example, a CD-ROM 1212, an IC memory 1214, and a memory card 1216. Alternatively, the game information is obtained from an external device through a communication device 1218 which is equipped on the main unit 1210 and connected to a communication line 2. The communication line 2 refers to a communication channel which allows data transmission and reception. In other words, the communication line may be a dedicated line (dedicated cable) for direct connection, a LAN through Ethernet (TM) or the like, and a communication network such as a telephone network, a cable network, or the Internet, whether its communication method is wired or wireless.

The main unit 1210 is equipped with a processing unit such as a CPU, and a reader for the information storage medium such as the IC memory and CD-ROM 1212. The main unit 1210 executes various game processes based on the game information read from the CD-ROM 1212 or the like and operation signals inputted from the game controllers 1202 and 1204, displays game images on the display 1220, and outputs game sounds from the speaker 1222.

The player operates an analog stick (joystick) or different types of buttons or keys equipped on the game controllers 1202 and 1204 while viewing the screen displayed on the display 1220, and enjoys moving and operating the characters in the martial arts game.

Figure 2:
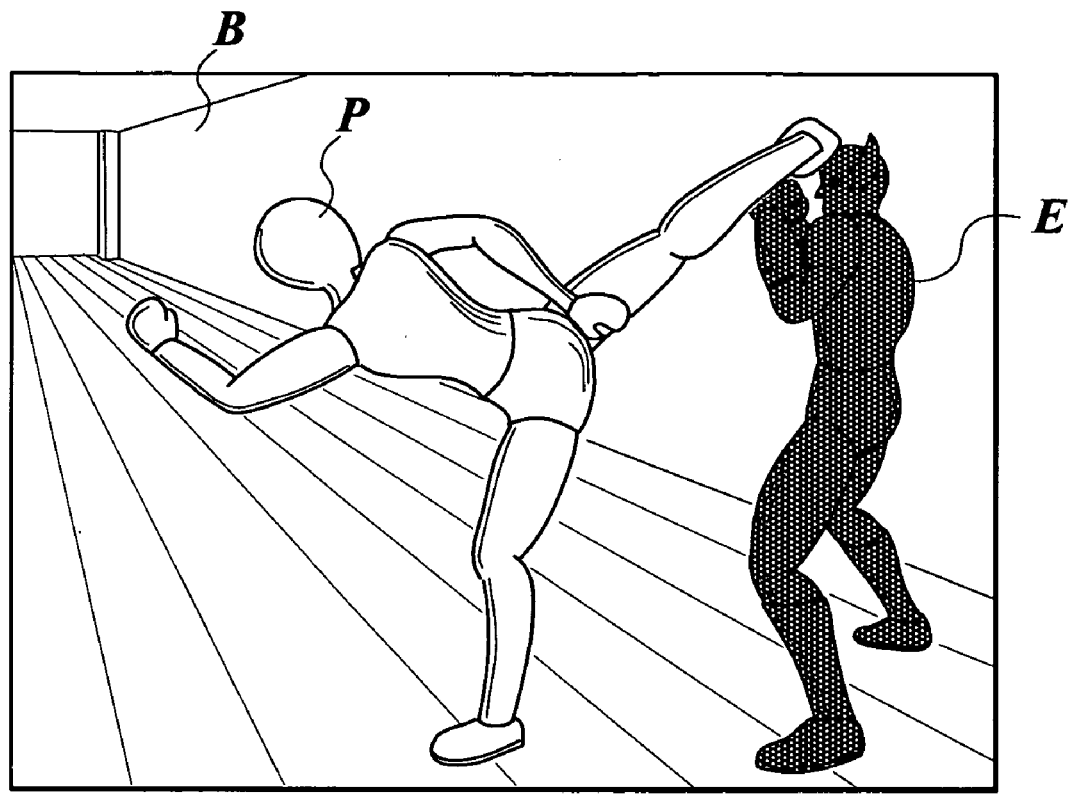
FIG. 2 is a drawing showing one game screen of a martial arts game.

FIG. 2 is a view showing one example of a game screen of a martial arts game in the present embodiment. A game space is formed with objects such as characters and background B in a virtual space. A three-dimensional CG (computer graphic) image is formed from a polygon and displayed from the viewpoint of a virtual camera provided in the virtual space.

A player character P controlled according to a player input and an enemy character E controlled by a computer are displayed on the game screen of the present embodiment. The player character P and the enemy character E are both set as a human being with an endobone structure.

The player advances from one stage to another by operating the character P to repeatedly perform martial arts techniques such as punches and kicks to knock down the enemy character. After advancing through several stages, the player clears a predetermined condition (for example, knocks down the enemy character, rescues a character, or procures the goal object, etc.) or the game ends when the damage sustained by the player character P is not less than a certain amount. The operation of the player P can be achieved the same as an action game of the conventional art and therefore description thereof is omitted here.

In the case of FIG. 2, the player character P executes an upper kick, striking a head of the enemy character E. In other words, the first object constituted by the player character P hits a second object constituted by the enemy character E. In the present embodiment, when the enemy character E receives a hit from the player character P, an X-ray effect process is executed as described below to enhance the visual effect.

[Description of X-ray Effect Process]

The X-ray effect process of the present embodiment inserts the state of the bone internal structure of the enemy character E sustaining damage from a kick delivered by the player character P, on the game screen and in this way impresses the intensity of the hit from the player character P.

Figure 3A:
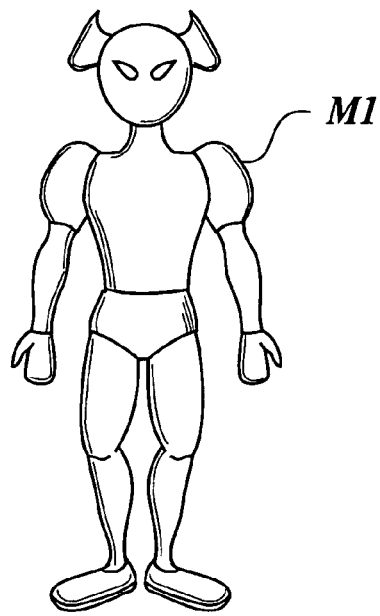
FIG. 3A is a drawing showing a model structure of an enemy character.
Figure 3B:
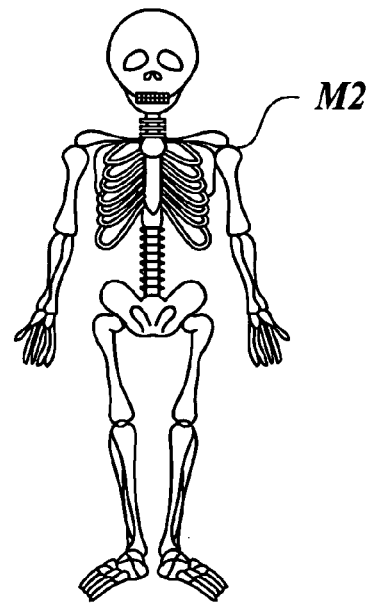
FIG. 3B is another drawing showing the model structure of the enemy character.
Figure 3C:
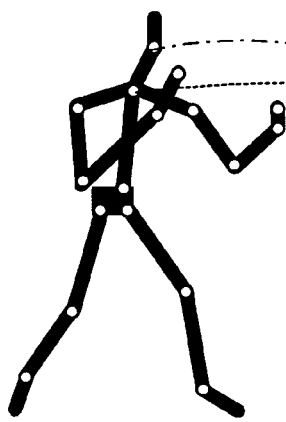
FIG. 3C is a drawing showing the model structure of the enemy character and a table of joint positions.

The object of the X-ray effect process includes a normal model and an internal structural model indicating an internal structure. FIG. 3A, 3B and 3C are views showing the model structure of the enemy character. The enemy character E shown in FIG. 3A is the normal model M1 prepared in advance and appearing on the normal game screen. FIG. 3B shows the bone model M2 prepared in advance and expressing the bone structure as the internal structure of the enemy character E. The normal model M1 and the bone model M2 possess the same joint structure. By controlling each joint position according to the predetermined common motion data shown in FIG. 3C, the models can be made to perform the same posture and the same range of motions.

In addition to a camera taken from the usual viewing points, the X-ray effect process utilizes a camera (hereafter called, "effect camera") for the effect process that is separately set.

Figure 4:
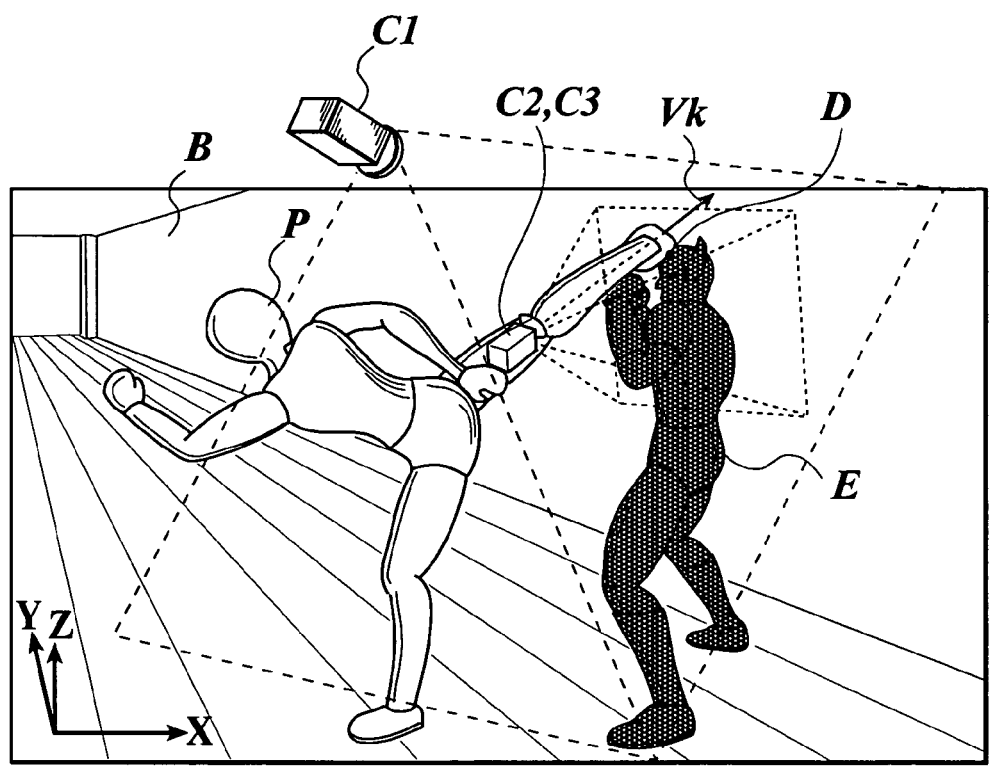
FIG. 4 is a drawing showing one example of a positional relation of a virtual camera and an object in the X-ray effect process of the first embodiment.

FIG. 4 is a view showing one example of the positional relation of the virtual camera and object in the X-ray effect process in the first embodiment. During a normal game play, the game screen shows a virtual space as seen from the normal camera C1. The normal camera C1 is called a "third-person viewpoint" and shows an external view of the state of the battle between the enemy character E and the player character P on the game screen. The effect cameras C2 and C3 are called the "first person viewpoint" and are virtual cameras positioned when the effect process is executed. In the present embodiment, the game screen shown during the X-ray effect process is generated and displayed by the effect cameras C2 and C3 viewpoints.

The effect cameras C2 and C3 are automatically positioned based on the hitting direction of the kick as vector Vk, and the hitting point D of the kick by the player character P. More specifically, they are set at a position separated as far as a certain distance from the enemy character E model, passing through the hitting point D and extending along a direct line in the direction of the hitting direction vector Vk, the view line is set to face the hitting direction vector Vk, and contains the hitting point D within the field angle. In the present embodiment, the effect cameras C2 and C3 are controlled while set to the same position and the same field angle. Needless to say, however, different settings are also allowed. The field angle of the effect camera C3 for example, may be set slightly narrower than the effect camera C2, and in a zooming-in state.

The normal model M1 is provided as the enemy character E when the effect camera C2 is selected as the viewpoint. The bone model M2 is provided at the same position and the same posture as the normal model M1 when the effect camera C3 is selected as the viewpoint. In other words, the screen rendered by the effect camera C2 shows an outer view of the enemy character E after receiving a kick. The screen rendered by the effect camera C3 is an image of the internal structure object of the enemy character E and corresponds to a transparent image or a Roentgen image (X-ray image) of the enemy character E.

Besides selecting these cameras and switching the viewpoints, the X-ray effect process of the present embodiment is also effective in running the various transitions and camera work that accompany switching the viewpoint.

Transitions are a screen switchover effect utilized in video expression for connecting one cut to another. For example, the fading-in, fading-out, fading-in from white, fading-out to white, cross-dissolving, overlapping, wiping, the enlarged image display equivalent to zooming-in, the reduced image display equivalent to zooming-out and the like correspond thereto.

Camera work is a change of the movement or field angle along the view-line by operating the virtual camera. For example, panning, tracking, zooming-in/zooming-out, rotating and the like correspond thereto. These image effect processes are performed independently or compositely when changing cuts due to the switch of the viewpoint and are capable of rendering a variety of stage effects.

FIG. 5 is a view showing one example of settings for the X-ray effect process. This view shows examples of the camera for the viewpoint corresponding to the cut, the object model to be filmed by the camera used for the viewpoint, and the transition and camera work executed when the viewpoint is switched.

As shown in FIG. 5, the X-ray effect process in the present embodiment is executed from the state where it is determined that the kick from the player character P has hit the enemy character E. This process comprises a total of six cuts on switching the viewpoint.

A first cut is the action until the kick of the player character P hits the enemy character E and a normal game screen is displayed with the normal camera C1 as the viewpoint. In the first cut, along with bringing the normal camera C1 close to the hitting point D, or zooming-in on the hitting point D (hereafter called simply, "zooming-in"), the screen is also made to fade out to white. By making the screen turn totally white at the end of the first cut, the cut linking to the second cut can be giving a supersensational impact.

In the X-ray effect process of the present embodiment, in order to emphasize the moment that the bone of the enemy character E suffers damage at the time of the hit, the motions of the player character P and enemy character E are paused and that state is maintained until the motions are resumed.

The second cut is filmed by the effect camera C2 as an external view of the enemy character E as seen by the player character P. In this case, the effect camera C2 films the normal model M1 of the enemy character E, and following up on the zooming-in effect of the first cut, zooms in for the designated image frames (that is, during the cut) towards the hitting point D.

Since the view line of the effect camera C2 corresponds to the direction of the force of the kick, and further the zooming-up is performed, the cut acquires a heightened sense of tension and power towards the hitting point D.

In the third cut, the effect camera C3 films the bone model M2 of the enemy character E and following up on the zooming-in effect from the first cut in the same way, zooms in towards the hitting point D during the cut.

The second cut dissolves into the third cut. In the present embodiment, the motion of the enemy character E is in a pausing state at this stage. Zooming-in (in this case, displaying an enlarged image) and dissolving are therefore achieved by generating a still image with the effect camera C2 as the viewpoint, and generating a still image with the effect camera C3 as the viewpoint and then making a composite of these images.

The effect camera C3 is subject to the same conditions as the effect camera C2 but the object for filming is the bone model M2 of the enemy character E. Therefore the movement on the screen is towards the hitting point D while maintaining the momentum of the zoom from the first cut, as if the viewpoint were moving into the interior of the enemy character E or the interior of the enemy character E were shown as a transparent image.

In the fourth cut, the bone model M2 is filmed by the effect camera C3 and the damage sustained by the bone is displayed. More specifically, a crack (bone fracture) texture is for example overlaid on the bone model M2 filmed by the effect camera C3 to show the damage sustained by the bone model M2 from the force of the blow.

In the fifth cut, the bone model M2 is filmed by the effect camera C3 and the effect camera C3 is controlled so as to be separated from the hitting point D, or to zoom out from the hitting point D (hereafter simply called, "zooming-out").

In the sixth cut, the normal model M1 is filmed by the effect camera C2, and zooming-out is performed the same as with the effect camera C2 in the fifth cut. The fifth cut dissolves into the sixth cut. In other words, by switching screens in the reverse sequence of the second cut and third cut, the interior of the enemy character E can be shown as returning from a transparent state to a normal state as seen externally. The X-ray effect process is then completed.

When the X-ray effect process is completed, the viewpoint switches to the normal camera C1, the normal game screen prior to the start of the effect processing returns, and the game continues. The X-ray effect process brought about by switching viewpoints and transitions and camera work, serves to emphasize the moment that the kick is sustained as seen by the player viewing the game screen, and enhances the impression of the fierceness of the kick.

In the present embodiment, the zooming-in and zooming-out processes not only vary the virtual camera field angle setting, but also render a predetermined blurring effect that radiates from the center of the image. Instead of the blurring effect, the game screen several frames prior to the current screen can be temporarily stored as image data and combined into a semi-transparent state with the current game screen.

Also, the dissolving can be performed by generating game screens from the effect cameras C2 and C3, temporarily storing these images and then performing the dissolving. However, the method is not limited to the mentioned example. For example, the effect camera C2 can be made to capture images of both the normal model M1 and bone model M2 of the enemy character E, gradually increase the transparency of the normal model M1 object, and conversely, gradually decrease the transparency of the bone model M2. Then, one image can be generated showing a game screen with the normal model M1 and bone model M2 dissolving into a semi-transparent state.

[Description of Function Block]

Figure 6:
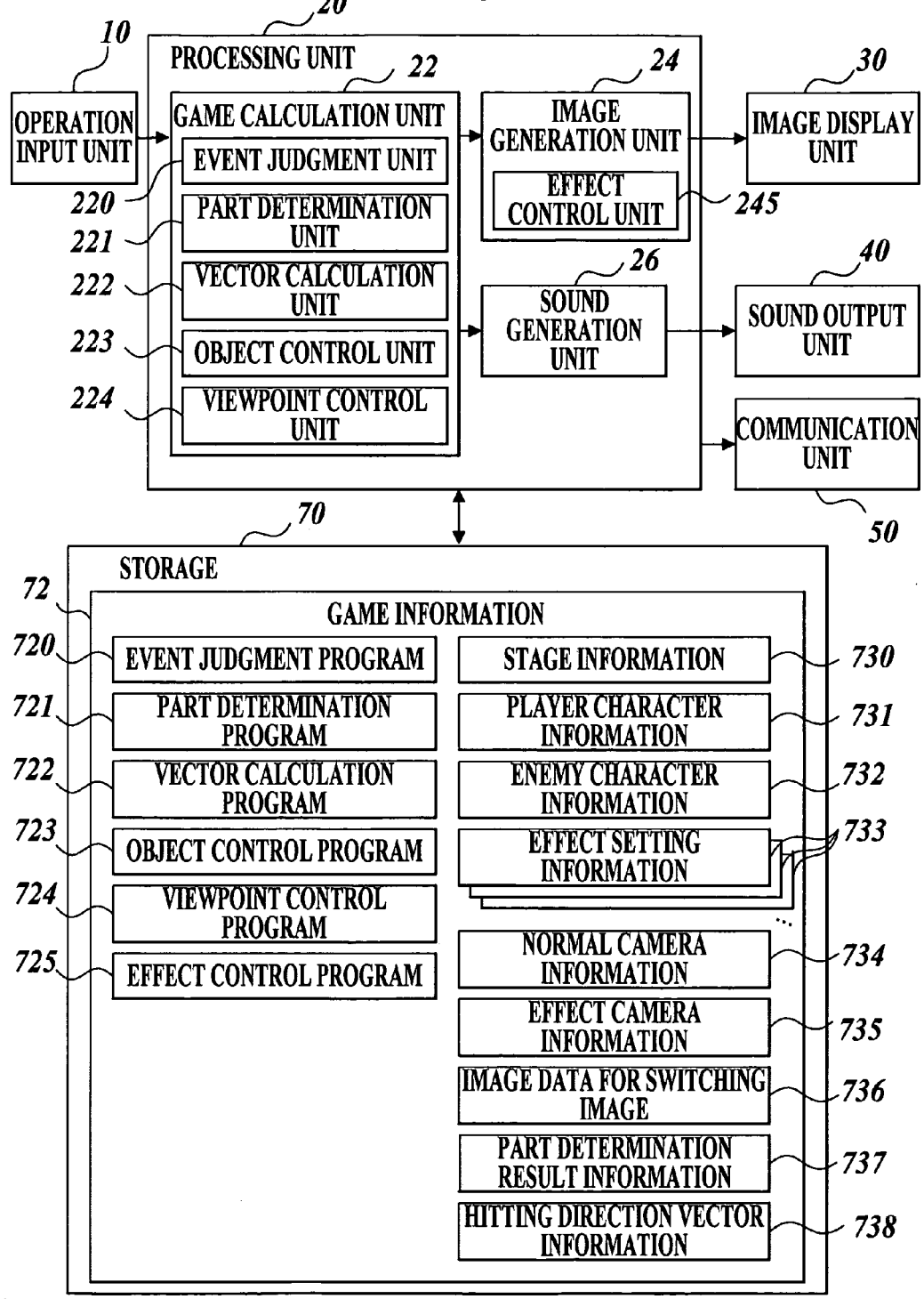
FIG. 6 is a block diagram showing one example of a functional structure of the first embodiment.

FIG. 6 is a block diagram showing one example of a functional structure of the present embodiment. As shown in FIG. 6, the home game unit 1200 comprises a operation input unit 10 for inputting operations from the game player, a processing unit 20 for processing operations to control the game unit and the game, an image display unit 30 for outputting game pictures to be displayed, a sound output unit 40 for outputting game sounds to be sound-outputted, a communication unit 50, and a storage 70 for storing a variety of programs and data.

The operation input unit 10 functions by means of a button switch, lever, dial, mouse, keyboard, or other various sensors, while outputting signals based on the operation data for the player character P inputted by the game player to the processing unit 20. In the present embodiment, the game controllers 1202 and 1204 in FIG. 1 correspond to this operation input unit.

The processing unit 20 is designed to control the whole home game unit 1200 as well as to execute various computing processes such as game computing. The functions thereof could be implemented by hardware such as a CPU (CISC type and RISC type) or an ASIC (gate array or the like), and the related control programs. The main unit 1210 in FIG. 1 corresponds to this processing unit.

The processing unit 20 includes a game calculation unit 22 serving mainly for game computing, an image generation unit 24 for generating the image signals to display the game images based on various data obtained from the processes executed by the game calculation unit 22, and a sound generation unit 26 for generating the sound signals to output the game sounds such as sound effect or BGM.

The game calculation unit 22 is designed to execute various game processes based on the signals inputted through the operation input unit 10, or the programs and data read from the storage 70. As the game processes, implemented are processes such as placing objects in the virtual space, controlling the movements of the player character P based on operation input from the operation input unit 10, controlling the movements of the enemy character E, determining an impact on object within the virtual space (hit judgment), setting the object color and transparency, calculating the game results (points), positioning of the viewpoints (virtual cameras) in the virtual space, selecting the viewpoint and replay display processing, etc.

In the present embodiment, the game calculation unit 22 comprises an event judgment unit 220, a part determination unit 221, a vector calculation unit 222, an object control unit 223, and a viewpoint control unit 224.

The event judgment unit 220 judges whether or not an event has occurred that causes a change (internal change) in the internal structure of the enemy character E. More specifically, a determination is made whether or not the kick by the player character P satisfies the attack success conditions. In other words, the event judgment unit 220 judges an event has occurred from the hit of the player character P (first object) and the enemy character E (second object).

The part determination unit 221 determines at what position the internal change actually has occurred, if the event judgment unit 220 judges that an event that causes a change in the internal structure has occurred. More specifically, the part determination unit 221 determines the impact position D where the kick hits from the type of fighting technique inputted by the player, and from positional relation of the player character P and the enemy character E.

The vector calculation unit 222 calculates the hitting direction vector Vk for the effect camera C2 and C3 positions.

The object control unit 223 controls the object positioning/deleting in the virtual space and object display attributes, etc. In particular in the present embodiment, the object control unit 223 controls the positioning and posture of the bone model M2 as the object for showing the internal structure of the enemy character E, for the same position and the same posture as the normal model M1 of the enemy character E. More specifically, the object control unit 223 controls the position and the posture so that the bone model M2 is to be the same as the normal model M1 by referring to the current position information and type of motion data for the enemy character E, and the motion frame number.

The viewpoint control unit 224 sets the normal camera C1 arrangement position, the view line direction and the field angle. The viewpoint control unit 224 also provides the effect cameras C2 and C3 at new positions and sets their view line direction and the field angle, etc. The viewpoint control unit 224 also controls the switching of these cameras as a viewpoint for generating an image.

More specifically, the effect cameras C2 and C3 are positioned at locations separated as far as a predetermined distance from the enemy character model E, on a direct line passing through the impact position D and extending towards hitting direction vector Vk, and set with a view line towards the hitting direction vector Vk and hitting point D included in the field angle. The cameras are switched according to the X-ray process effect settings to vary the field angle and view direction.

The functions of the image generation unit 24 can be implemented by the processing unit such as CPU, DSP or the like, and the control program and the IC memory for image frames such as a frame buffer. The image generation unit 24 executes a geometry conversion process and a shading process based on the position and the posture of the player character P and enemy character E and those of the viewpoint computed by the game calculation unit 22. The image signals generated for the game images are outputted to the image display unit 30. In the present embodiment, the image generation unit 24 comprises an effect control unit 245 for implementing a transient process.

The sound generation unit 26, which is implemented by a processing unit such as CPU, DSP or the like, and its control program, generates sounds used in the game such as sound effect and BGM, and the sound signals are outputted to the sound output unit 40.

The image display unit 30 is designed to display the game images by refreshing one frame per 1/60 second for instance, based on the image signals generated by the image generation unit 24. The image display unit 30 can be implemented by hardware such as a CRT, LCD, ELD, PDP, HMD or the like. The display 1220 in the example of FIG. 1 corresponds to this unit.

The sound output unit 40 outputs game sounds such as sound effect and BGM based on the sound signals from the sound generation unit 26. The speaker 1222 in the example of FIG. 1 corresponds to this unit.

The communication unit 50 connects with a communication line to transmit and receive data to/from an external device. The communication unit 50 is implemented by, for example, a module such as Bluetooth (TM) or IrDA, a modem, a TA, a communication cable jack, and a control circuit. The communication device 1218 in FIG. 1 corresponds to this unit. Information on such as protocol stack or the like used in the communication by the communication unit 50 is, for example, stored in the storage 70 to be read as necessary.

The storage 70 stores system programs (not shown) for implementing functions for integrally controlling the processing unit 20 of the home game unit 1200, and stores the game information 72 holding the programs and data needed for implementing the game. The storage 70 is implemented for example by an information storage medium such as IC memories, hard disks, CD-ROMs, MOs, and DVDs of different types. The storage 70 corresponds to the CD-ROM 1212, IC memory 1214, and the memory card 1216 in FIG. 1.

The game information 72 includes programs and data for making the processing unit 20 function as the game calculation unit 22. The programs include the event judgment program 720 for making the processing unit 20 function as the event judgment unit 220, the part determination program 721 for making the processing unit 20 function as the part determination unit 221, the vector calculation program 722 for making the processing unit 20 function as the vector calculation unit 222, the object control program 723 for making the processing unit 20 function as the object control unit 223, the viewpoint control program 724 for making the processing unit 20 function as the viewpoint control unit 224, and the effect control program 725 for making the processing unit 20 function as the effect control unit 245.

The effect control program 725 loads and uses programs prepared for each type of transient. The effect control program 725 may also be configured to function by supplying parameters to each type of transient in general-purpose programs.

The game information 72 includes as data, the stage information 730, the player character information 731, the enemy character information 732, the effect setting information 733, the normal camera information 734, the effect camera information 735, the image data for switching images 736 (or image switching data 736), the part determination result information 737, and the hitting direction vector information 738. Though not shown in the drawing, the game information 72 also includes the information required for replays when making a replay display.

The stage information 730 stores motion data, texture data and object data such as for items appearing in the stage and background, and required for configuring the game stage in the virtual space.

The player character information 731 stores information required for positioning the player character P in the virtual space and for controlling movement according to operation inputs made by the player, such as object data, texture data and motion data, etc.

The enemy character information 732 stores information required for positioning the enemy character E in the virtual space and for controlling movement by computer.

Figure 7:
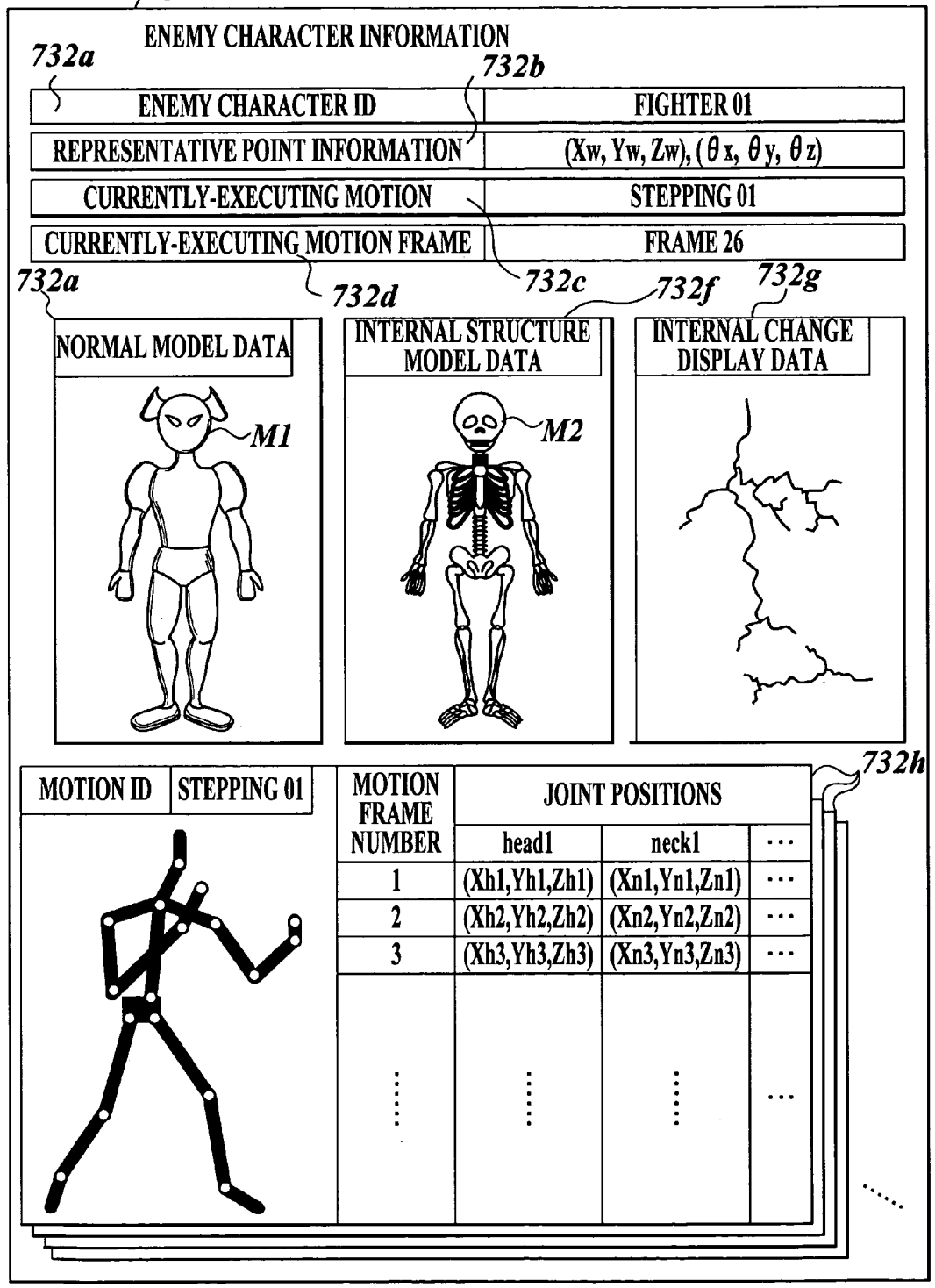
FIG. 7 is a view showing one example of data configurations of information for the enemy character.

FIG. 7 is a view showing one example of data configurations of enemy character information 732 in the present embodiment. As shown in FIG. 7, the enemy character information 732 stores an enemy character ID 732*a* which is identification information, a representative point information 732*b* for representing rotation of the local coordinates and position coordinates in the world coordinate system for representative points of the enemy character E, a currently-executing motion 732*c* for showing the type of motion currently being applied to the enemy character E, and a currently-executing motion frame 732*d* for showing the frame number of the motion currently being applied.

The enemy character information 732 further stores a normal model data 732*e* for storing texture data and object data of the normal model M1 for establishing the outer appearance of the enemy character E1, an internal structure model data 732*f* for storing texture data and object data on the bone model M2, an internal change display data 732*g* including information for displaying the state of the change in the internal structure, and a motion data 732*h*. In the present embodiment, the internal change display data 732*g* stores crack pattern data (for example, a monochrome image depicting bone fractures) of the damage to the bone.

The effect setting information 733 stores various types of setting information relating to the X-ray effect process. FIG. 8 is a view showing one example of the effect setting information 733 in the present embodiment. As shown in FIG. 8, the effect setting information 733 is provided for each applying event type 733*a*. In the present embodiment, this applying event type 733*a* corresponds to the type of attack technique of the player character P.

The effect setting information 733 includes a cut number 733*b*, a drawing frame number 733*c* constituting the progress scale of the process, a camera 733*d* for indicating the camera as the viewpoint, an object 733*e* showing the type of object to be filmed with the virtual camera as the viewpoint, and a field angle setting 733*f* for setting the field angle for filming. The field angle setting 733*f* for example stores a zoom magnification value for each drawing frame, as a 1X (one-fold) magnification of the current frame size in the case of zooming. The viewpoint control unit 224 positions the camera as indicated by the camera 733*d* according to the drawing frame number 733*c*. Along with switching the viewpoint to the applicable camera, the viewpoint control unit 224 also controls camera work such as zooming, according to the field angle setting 733*f*. The object control unit 223 positions objects of the normal model M1 or the bone model M2 of the enemy character E in the virtual space according to the instructions of the object 733*e* linked to the camera 733*d*.

The effect setting information 733 stores a transient process type 733*g* for showing the type of transient applied along with switching the viewpoint, and the applying frame number 733*h* for the applicable transient. The effect control unit 245 performs the transient process instructed by the transient process type 733*g* on the drawing frame predetermined by the applying frame number 733*h*.

The normal camera information 734 stores information on filming conditions such as the posture, the field angle and the position of the normal camera C1 constituting the viewpoint for creating the game screen during normal game play. The effect camera information 735 stores information on filming conditions such as the posture, the field angle and the position of the effect cameras C2 and C3 constituting the viewpoint for creating the game screen during effect process.

The image data for switching images 736 (or image switching data) temporarily stores synthesizing image data utilized in transient process such as for dissolving.

The part determination result information 737 stores position coordinates of the impact position D judged by the part determination unit 221. The part determination result information 737 may also store identification information on which predetermined part corresponds to the position of the hitting point D.

The hitting direction vector information 738 stores information on the hitting direction vector Vk calculated by the vector calculation unit 222.

[Description of Process Flow]

Next, the flow of the X-ray effect process of the present embodiment is described with reference to FIG. 9 through FIG. 11. The X-ray effect process is implemented with the processing unit 20 loading and running the event judgment program 720, the part determination program 721, the vector calculation program 722, the object control program 723, the viewpoint control program 724, and the effect control program 725.

Here, the process in regard to the start of the home game unit 1200, and the display and the control of the player character P and enemy character E, can be executed in the same way as a martial arts action game of the related art.

Figure 9:
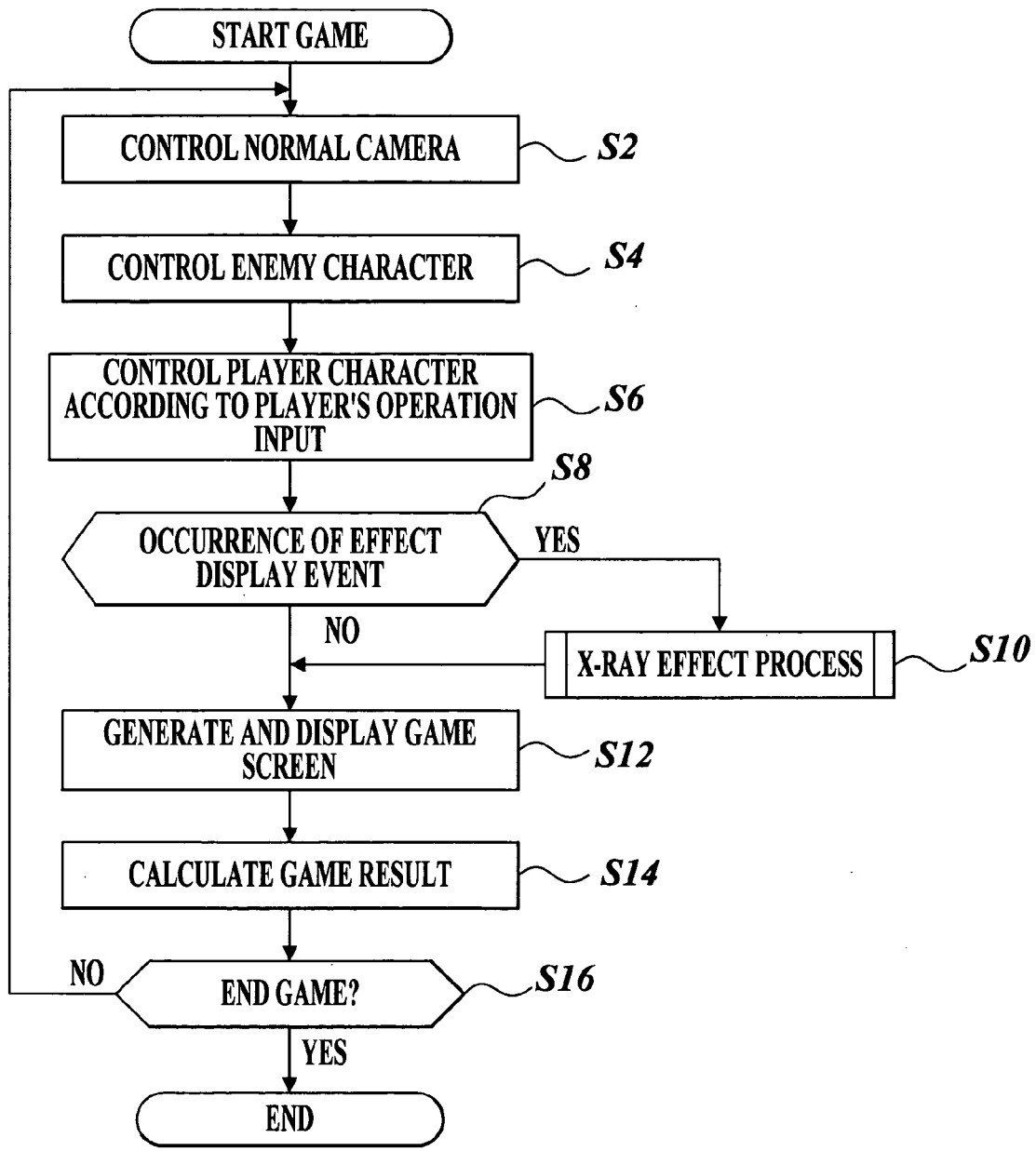
FIG. 9 is a flowchart illustrating the overall flow of the game process.

FIG. 9 is a flowchart for illustrating the overall flow of the game process of the present embodiment. The objects comprising the game stage structure such as the background or the like are already positioned in the virtual space and the game is started.

As shown in FIG. 9, first of all, the viewpoint control unit 224 controls the position and the field angle of the normal camera C1 (step S2). Next, the game calculation unit 22 controls the enemy character E according to the predetermined thinking routine (step S4). For each control, the representative point information 732*b* and currently-executing motion 732*c*, as well as the currently-executing motion frame 732*d* of the enemy character E can be updated any time. The game calculation unit 22 controls the player character P according to the operation input of the player (step S6).

Here, the event judgment unit 220 judges whether or not the predetermined event in which the effect process is to be executed has occurred (step S8). More specifically, the player inputs a kick operation, and at that moment in time, the kick hits the enemy character E when the predetermined attack success condition is satisfied in terms of relative positional relationship between the enemy character E and player character P. In other words, the event judgment unit 220 judges the player character P object has hit the enemy character E object and therefore it is judged that an event causing a change in the internal structure has occurred. For example, if the gap between the two objects is so large that the kick has not hit the object, it is judged that no event has occurred.

When the event judgment unit 220 judges that the predetermined event has occurred (step S8; YES), the game calculation unit 22 executes the X-ray effect process (step S10). When the event judgment unit 220 judges that no event has occurred (step S8; NO), the image generation unit 24 generates a game screen with the normal camera C1 as the viewpoint, and displays it on the image display unit 30 (step S12). The game calculation unit 22 then calculates game results (step S14), such as point calculations for damage, stage clear judgment and the like. If the calculated results satisfy the end conditions (step S16; YES), the game is ended.

Figure 10:
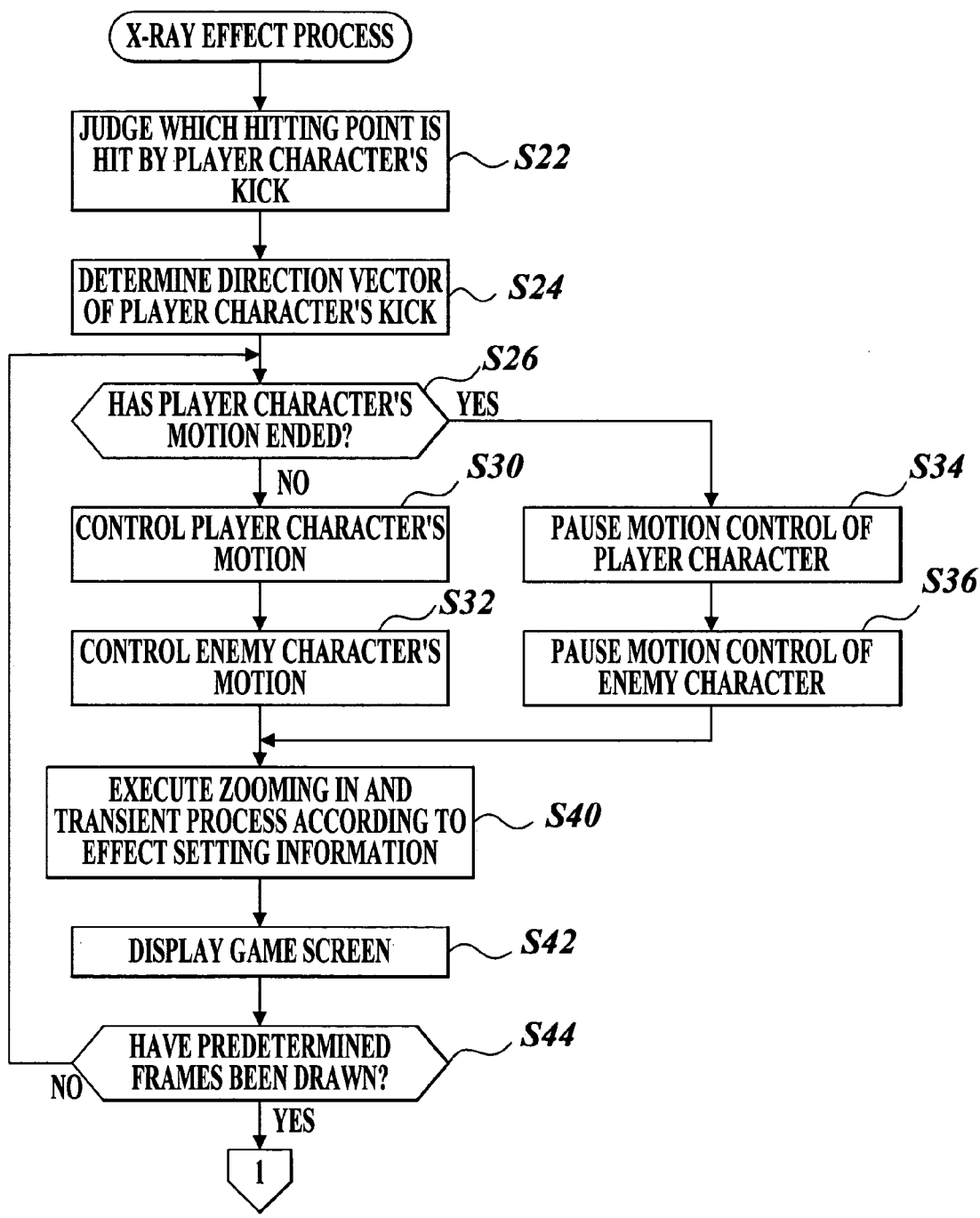
FIG. 10 is a flowchart illustrating a flow of the X-ray effect process in the first embodiment.
Figure 11:
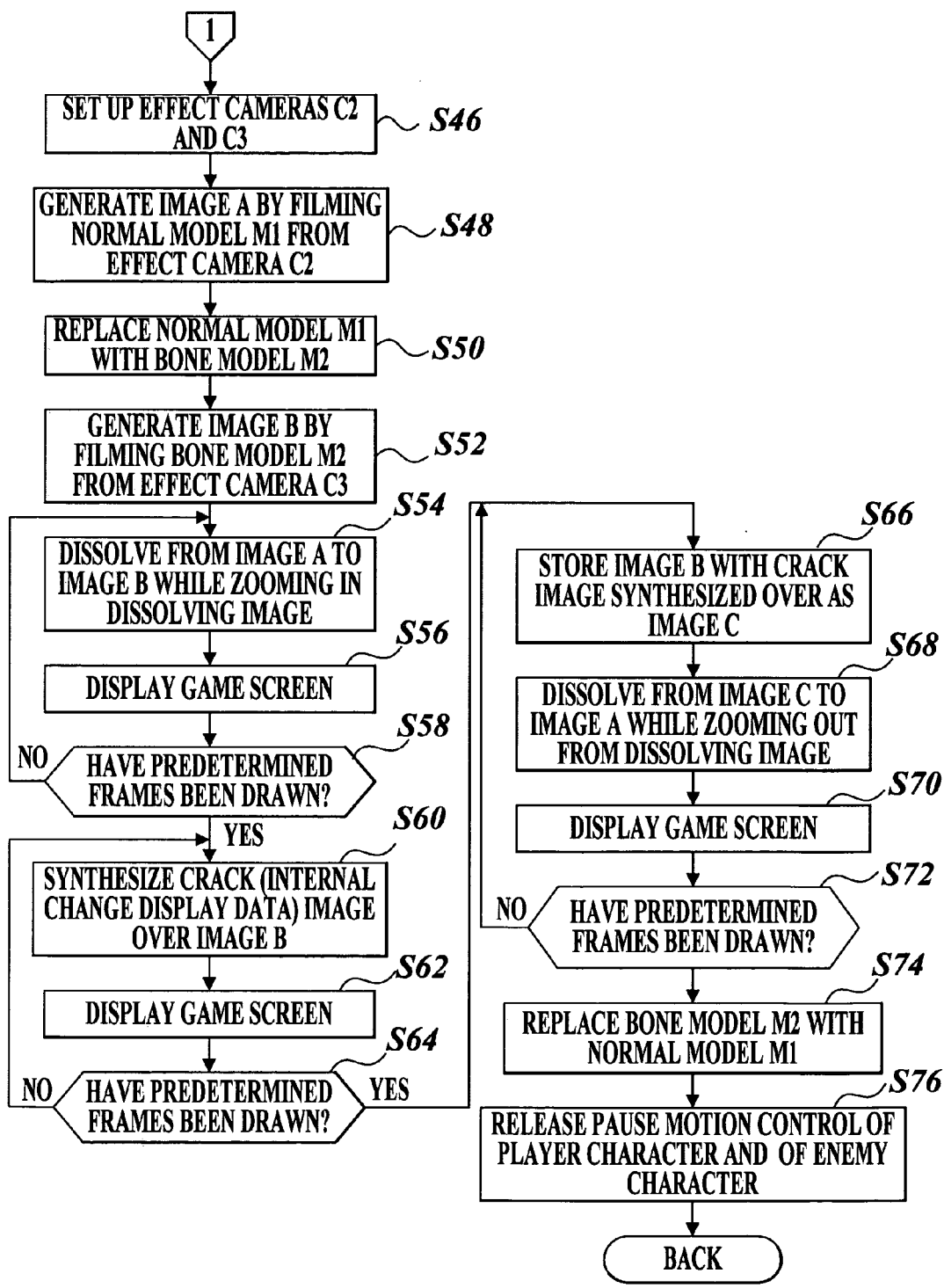
FIG. 11 is a flowchart illustrating the flow of the X-ray effect process in the first embodiment.

FIG. 10 and FIG. 11 are flowcharts for illustrating the flow of the X-ray effect process in the first embodiment. These are flowcharts for the case that it is judged that the kick of the player character P has hit the enemy character E.

First of all, as shown in FIG. 10, the part determination unit 221 determines the position where the kick hits (step S22). More specifically, the part determination unit 221, for example, determines the position coordinates of the hitting point D where the kick hits, and stores these coordinates in the part determination result information 737. The vector calculation unit 222 then calculates the hitting direction vector Vk of the kick, and stores the vector in the hitting direction vector information 738 (step S24).

The game calculation unit 22 then refers to the enemy character information 732 and determines whether or not the motion of the player character P has ended (step S26).

If it is determined that the motion has not ended (step S26; NO), the game calculation unit 22 controls the player character P (step S30) according to the motion data 732*h*, and then controls the enemy character E (step S32). At this step, as the objects expressing each character, the normal model M1 is positioned and controlled.

If it is determined that the motion has ended, (step S26; YES), the game calculation unit 22 pauses motion control of the player character P (step S34) and also pauses motion control of the enemy character E (step S36).

Next, the viewpoint control unit 224 gradually zooms in the camera C1 view line towards the hitting point D as much as one drawing frame, according to the settings for the first cut of the effect setting information 733, and the effect control unit 245 performs fading-out-to-white process as much as one drawing frame (step S40). The image display unit 30 displays a game image with image effects applied on, the image effects having the normal camera C1 set as the viewpoint (step S42). The game screen is generated up to the drawing frame number 733*c* set as the first cut, and if the game screen has been displayed (step S44; YES) the process advances to the second cut.

In the second cut as shown in FIG. 11, the viewpoint control unit 224 positions the effect cameras C2 and C3 (step S46) based on the part determination result information 737 and the hitting direction vector information 738. More specifically, the effect cameras C2 and C3 are automatically positioned based on the hitting point D hit by the kick of the player character P, and the hitting direction vector Vk of the kick. In other words, these cameras are provided with the view line facing the hitting direction vector Vk at a position separated by a predetermined distance from the enemy character E model, on a line passing through the hitting point D and extending towards the hitting direction vector Vk.

Next, according to the settings corresponding to the second cut of the effect setting information 733, the image generation unit 24 generates an image A with the normal model M1 of the enemy character E as the camera target object with the effect camera C2 as the viewpoint, and stores the image A in the image switching data 736 (step S48).

Next, the object control unit 223 positions the bone model M2 instead of the normal model M1 (step S50). The image generation unit 24 then generates an image B with the bone model M2 of the enemy character E as the camera target object, and the effect camera C3 as the viewpoint. The image generation unit 24 stores the image B in the image switching data 736 (step S52).

At this step, images have been prepared to be dissolved in the second cut and the third cut. The effect control unit 245 therefore executes dissolving process from image A into image B on the drawing frame of the applying frame number 733h. The effect control unit 245 also zooms in on the dissolved image (in this case, corresponding to an enlarged display of the image) (step S54).

With the use of an external image of the enemy character E, the image display unit 30 shows the dissolving into an image of the internal structure (step S56). If the game images have been drawn up to the game image for the drawing frame number 733c set in the second cut and the third cut (step S58; YES), then the process advances to the fourth cut.

In the fourth cut, the effect control unit 245 synthesizes an overlay, for example, of the crack texture of the internal change display data 732g with respect to the game image with the effect camera C3 as the viewpoint (step S60), according to the settings corresponding to the fourth cut of the effect setting information 733. The image display unit 30 shows an image with cracks in the bone added on, as the game screen (step S62). In this case, cracks can be made to appear as if it were occurring from the hitting point D by increasing the rate of the overlay from the center on outwards in a short time, along the progression of the drawing frame.

If the game images are drawn up to the drawing frame number 733c set in the fourth cut (step S64; YES) then the process advances to the fifth cut.

In the fifth cut, first of all, the image generation unit 24 stores a screen which is the bone model M2 with the crack texture synthesized over as an image C in the image switching data 736 (step S66).

At this step, images have been prepared to be dissolved in the fifth cut and the sixth cut. The effect control unit 245 therefore executes the dissolving process from image C into image A on the drawing frame of the applying frame number 733h, according to the settings for the fifth and sixth cuts of the effect setting information 733. The effect control unit 245 also zooms out from the dissolved image (in this case, corresponding to a reduced display of the image) (step S68).

The image display unit 30 displays a game screen with an image showing an outer view of the enemy character E dissolving into an image showing the bone structure with fractures of the enemy character E (step S70). Then, if the game images up to the drawing game number 733c set in the fifth and sixth cuts have been drawn (step S72; YES), the object control unit 223 positions the normal model M1 as the object for the enemy character E, instead of the bone model M2 (step S74).

The game calculation unit 22 releases the pause on control of the enemy character E and player character P (step S76), and ends the X-ray effect process.

[Description of Sample Screens]

FIG. 12A through FIG. 14C are views showing examples of the X-ray effect process screens in the present embodiment.

Figure 12A:
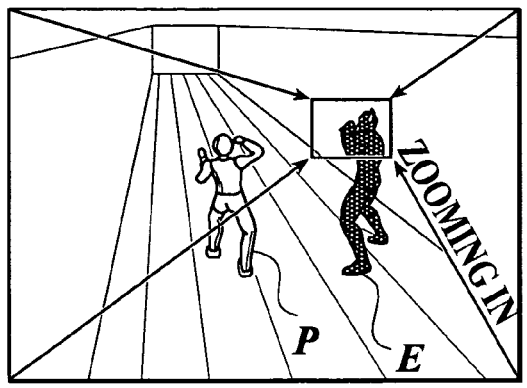
FIGS. 12A, 12B and 12C are views showing an example of the screen display sequence of X-ray effect process in the displaying order in the first embodiment.
Figure 12B:
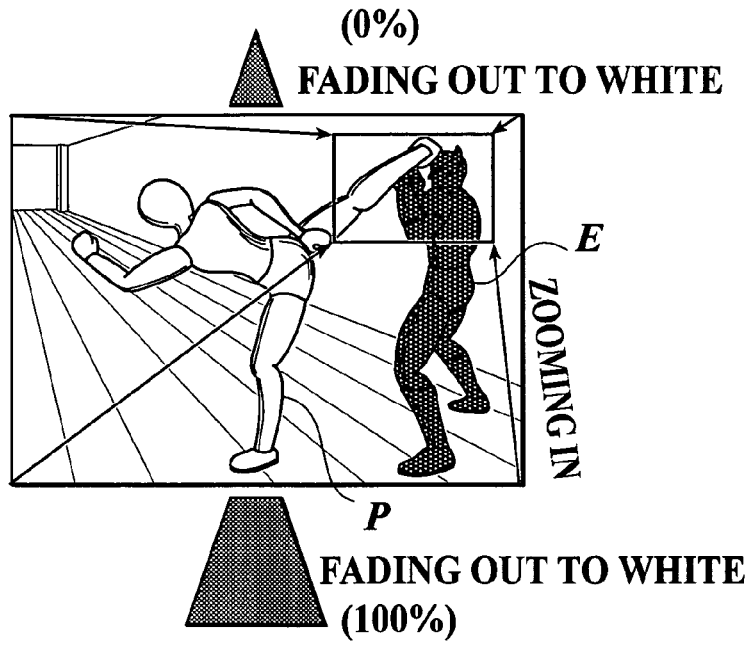
Figure 12C:
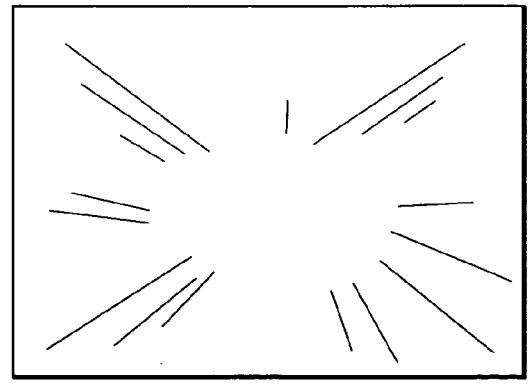

FIG. 12A, 12B and 12C correspond to screens in the first cut. As the kick action starts in FIG. 12A, the screen is zoomed in towards the frame on the internal side in the figure centering on the hitting point D and then fades out to white. FIG. 12B corresponds to a screen in the middle of the zooming, and FIG. 12C corresponds to a screen that has faded out to white.

FIG. 13A, 13B and 13C correspond to screens from the second cut to the fourth cut. FIG. 13A corresponds to a screen A which corresponds to the normal model M1 of the enemy character E filmed by the effect camera C2, and FIG. 13B corresponds to screen B which corresponds to the bone model M2 of the enemy character E filmed by the effect camera C3. In FIG. 13A and FIG. 13B, the camera is gradually zooming in towards the internal side of the frame centering on the hitting point D with dissolving performed. FIG. 13C is a screen corresponding to the fourth cut, and is synthesized with a crack image and zoomed in on the screen B, and shows the state of the damage to the bone from the kick.

FIG. 14A, 14B and 14C correspond to screens from the fifth cut to the sixth cut and after the X-ray effect process is ended. FIG. 14A corresponds to screen C showing the state of damage to the bone. FIG. 14B corresponds to the screen A. FIG. 14A and 14B are gradually zooming out from the internal side of the frame centering on the hitting point D towards the outer margin of the frame with dissolving. FIG. 14C corresponds to after the end of the X-ray effect process, and the viewpoint has been switched to the first camera. In FIG. 14C, the pause of the control is released from the enemy character E and from the player character P that have been temporarily paused for the X-ray effect process. The enemy character E is blown away by the kick.

The moment that the kick is hit is in this way emphasized, and an impression of the strong force of the kick is in this way impressed to the player viewing the game screen by the effect of the series of X-ray effect process on the game screen.

[Hardware Configuration]

Figure 15:
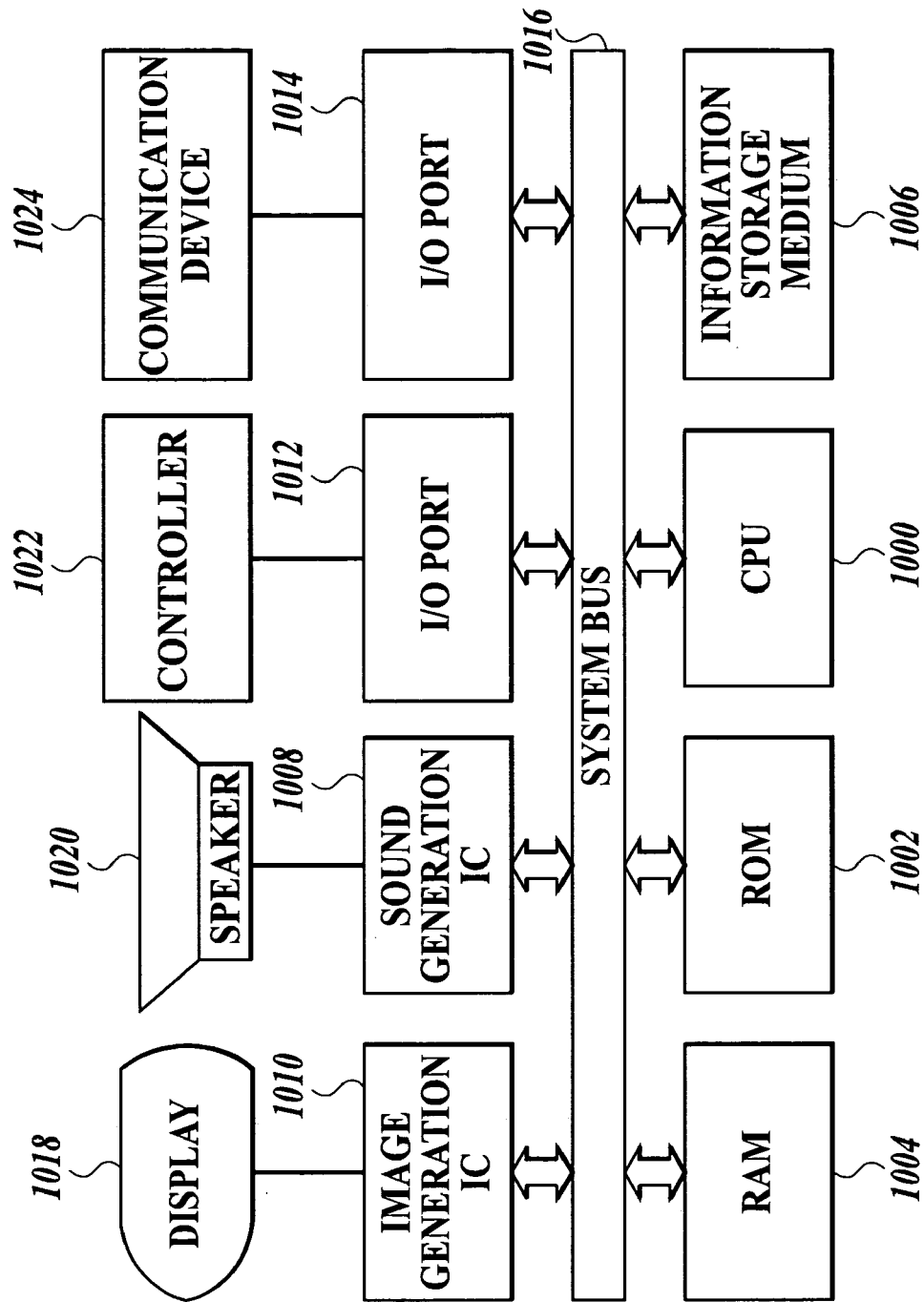
FIG. 15 is a block diagram showing one example of a hardware structure representing the home game unit of the present invention.

Next, description will be made of a hardware structure capable of implementing the functions of the home game unit 1200. FIG. 15 shows an example of the hardware structure according to the present embodiment. The home game unit 1200 has a CPU 1000, a ROM 1002, a RAM 1004, an information storage medium 1006, a sound generation IC 1008, an image generation IC 1010, and I/O ports 1012 and 1014. They are connected to each other via a system bus 1016 in order to input/output data.

The CPU 1000 corresponds to the processing unit 20 in FIG. 6, and is designed to wholly control the game unit and execute various data processes according to programs stored in the information storage medium 1006, as well as to a system program stored in the ROM 1002, and to the operation input signals inputted through the control device 1022.

The ROM 1002, the RAM 1004 and the information storage medium 1006 serve as the storage 70 in FIG. 6. The ROM 1002 corresponds to the IC memory implemented on the main unit 1210, and stores the programs and data related to the control of the main unit 1210, such as the system program. The RAM 1004 is a storage means designed to act as a work area of the CPU 1000 or the like. It stores information given in the information storage medium 1006 or the ROM 1002, or the calculation results by the CPU 1000. The information storage medium 1006 corresponds to the CD-ROM 1212, the IC memory 1214 and the memory card 1216 of FIG. 1, and stores the game information 72 of FIG. 6. The information storage medium 1006 stores information stored in the ROM 1002 in the form of an IC memory card or removable hard disk unit, or MO, etc. Information in the information storage medium 1006 is loaded and used as needed.

The sound generation IC 1008 is an integrated circuit designed to generate game sounds such as sound effect and BGM based on the information stored in the ROM 1002 or the information storage medium 1006. The speaker 1020 outputs these game sounds. The speaker 1020 serves as the sound output unit 40 in FIG. 6 or the speaker 1222 in FIG. 1.

The image generation IC 1010 is an integrated circuit for generating pixel information for outputting images to a display device 1018. The image generation IC 1010 corresponds to the image generation unit 24 in FIG. 6.

The display device 1018 serves as the image display unit 30 in FIG. 6 or the display 1220 in FIG. 1.

The I/O port 1012 is connected to a controller 1022. The I/O port 1014 is connected to a communication device 1024.

The controller 1022 corresponds to the operation input unit 10 in FIG. 6 or the game controllers 1202 and 1204, and is designed for a game player to input various operations.

The communication device 1024 is designed to input/output various information to be used in the game unit to/from an external device. It is connected to another game device in order to transmit/receive information required for the game program. It also transmits/receives the game program information via a communication line. The communication device 1024 corresponds to the communication unit 50 in FIG. 6 or the data communication unit 1218 in FIG. 1.

Here, processes executed in the image generation IC 1010, the sound generation IC 1008 or the like may be executed software-wise with the use of the CPU 1000, a general-purpose DSP or the like.

The present invention is applied not only to the home game unit 1200 shown in FIG. 1, also to various devices including an arcade game device, a mobile game device, and a large-sized attraction device in which many players can participate.

Figure 16:
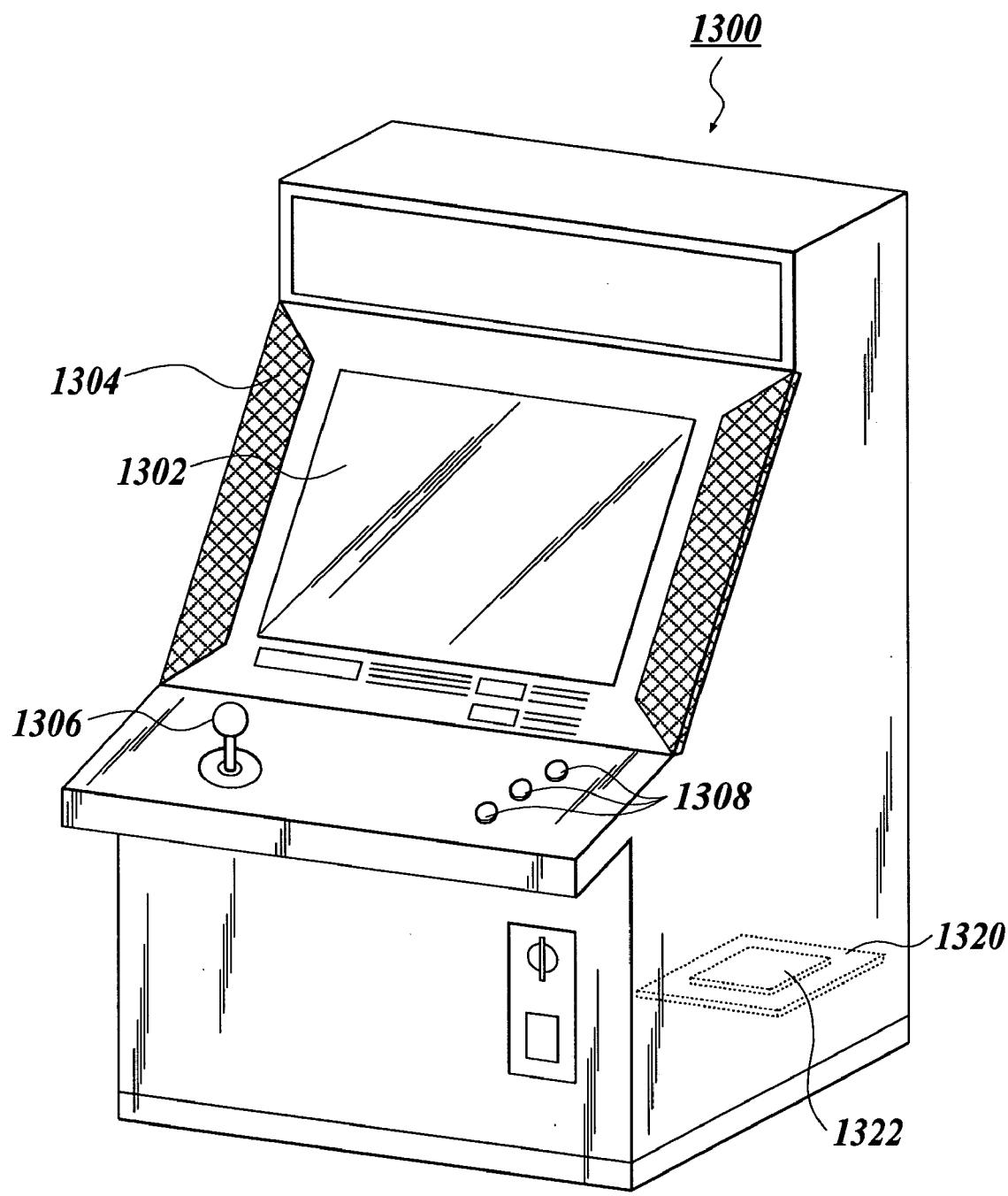
FIG. 16 is a view showing an external view of the present invention when applied to an arcade game apparatus.

FIG. 16 shows an example of the external view of an arcade game unit 1300 to which the present invention is applied, for example. As shown in FIG. 16, the arcade game unit 1300 is provided with a display 1302 for displaying game pictures, a speaker 1304 for outputting sound effect and BGM in the game, a joystick 1306 for inputting front-back and left-right operations, push buttons 1308, and a control unit 1320 for integrally controlling the arcade game unit 1300 by computer processing to execute a given game.

The control unit 1320 is equipped with a processing unit such as a CPU, and a ROM 1322 in which the programs and data are stored that are required to control the arcade game unit 1300 and to execute the game. The CPU mounted on the control unit 1320 reads from the ROM 1322 as appropriate and computes the programs and data to execute a variety of processes.

The game player operates the joystick 1306 and push buttons 1308 while viewing the game pictures displayed on the display 1302, operating the player character P, to enjoy playing the game.

It should be understood that the application of the present invention is not limited to games to be executed on a stand-alone device, but the present invention may be applied to those called network games. Examples of the system structure designed to implement a network game are as follows: (1) a structure having a home PC or home game system as a game terminal to be connected to a server via a wired/wireless communication line such as the Internet or a dedicated line network; (2) a structure connecting multiple game terminals to each other via a communication line without a server; (3) a structure connecting multiple game terminals via a communication line, one of which functions as a server; and (4) a structure physically linking multiple game terminals with each other to serve as a single system (e.g. arcade game system).

Second Embodiment

Next, a second embodiment of the present invention is described with reference to FIG. 17 through FIG. 20. The present embodiment can be achieved with the same component as these in the first embodiment, except that the method for a transient process is different. Components identical to the first embodiment are assigned the same reference numerals, and therefore their description is omitted.

[Description of Function Block]

Figure 17:
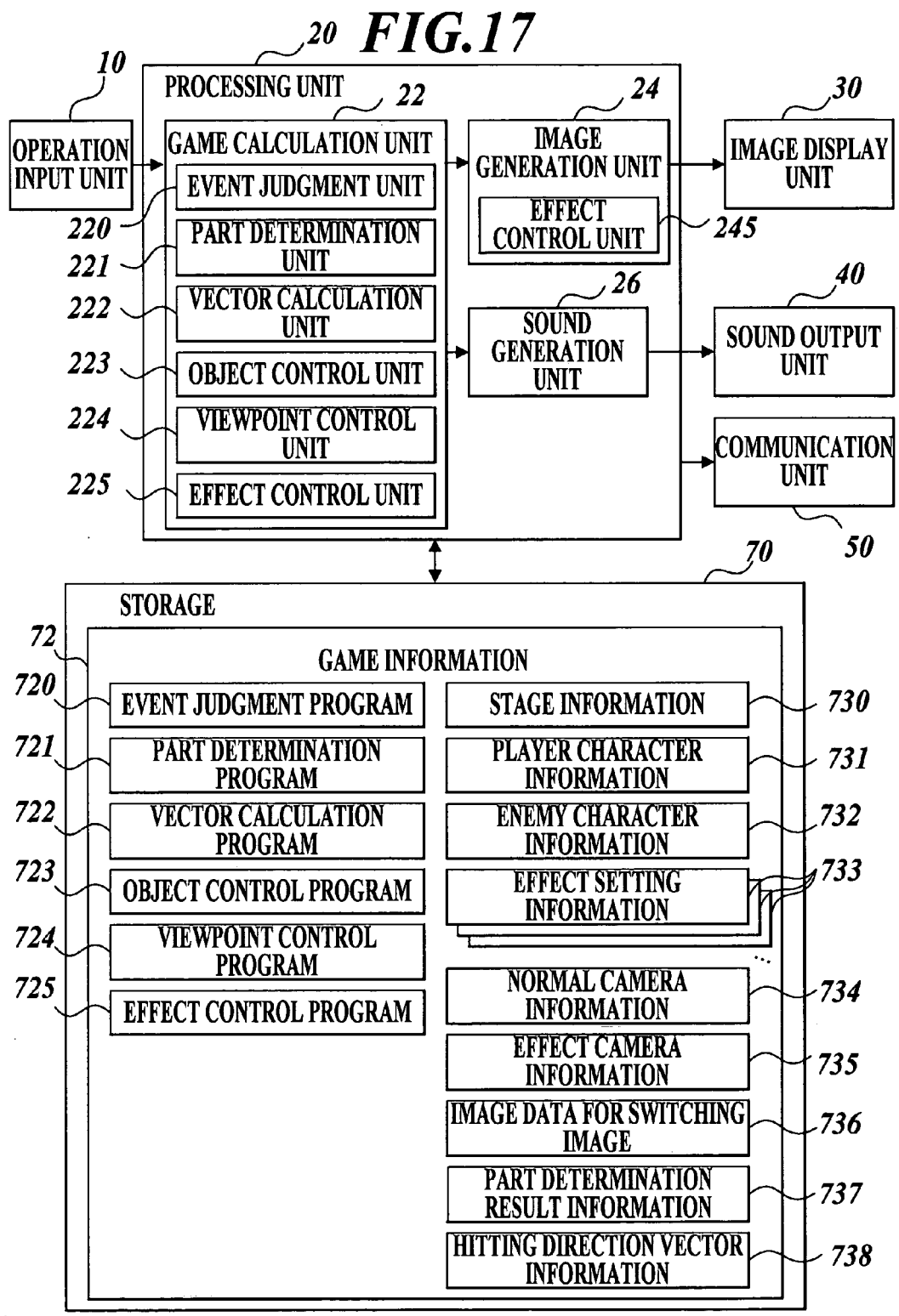
FIG. 17 is a block diagram showing one example of a functional structure in the second embodiment.

FIG. 17 is a block diagram showing an example of the functional structure of the present embodiment. In the present embodiment, the effect control unit 225 for running the transient process is executed by the game calculation unit 22. In other words, different types of transient processes are achieved by varying the object position and its display setting (in particular, the transparency), rather than by image effect process or image synthesis by the image generation unit 24.

The effect control program 725 therefore includes specific procedures for changing the object display setting for each type of transient.

FIG. 18 is a view showing one example of effect setting information 733 of the present embodiment. In the present embodiment, since the transient is achieved by the game calculation unit 22, all the processes related to zooming is set to be implemented by changing the camera field angle. A portion shown by the dashed line in FIG. 18 indicates the portion different from the first embodiment.

[Description of Process Flow]

Figure 19:
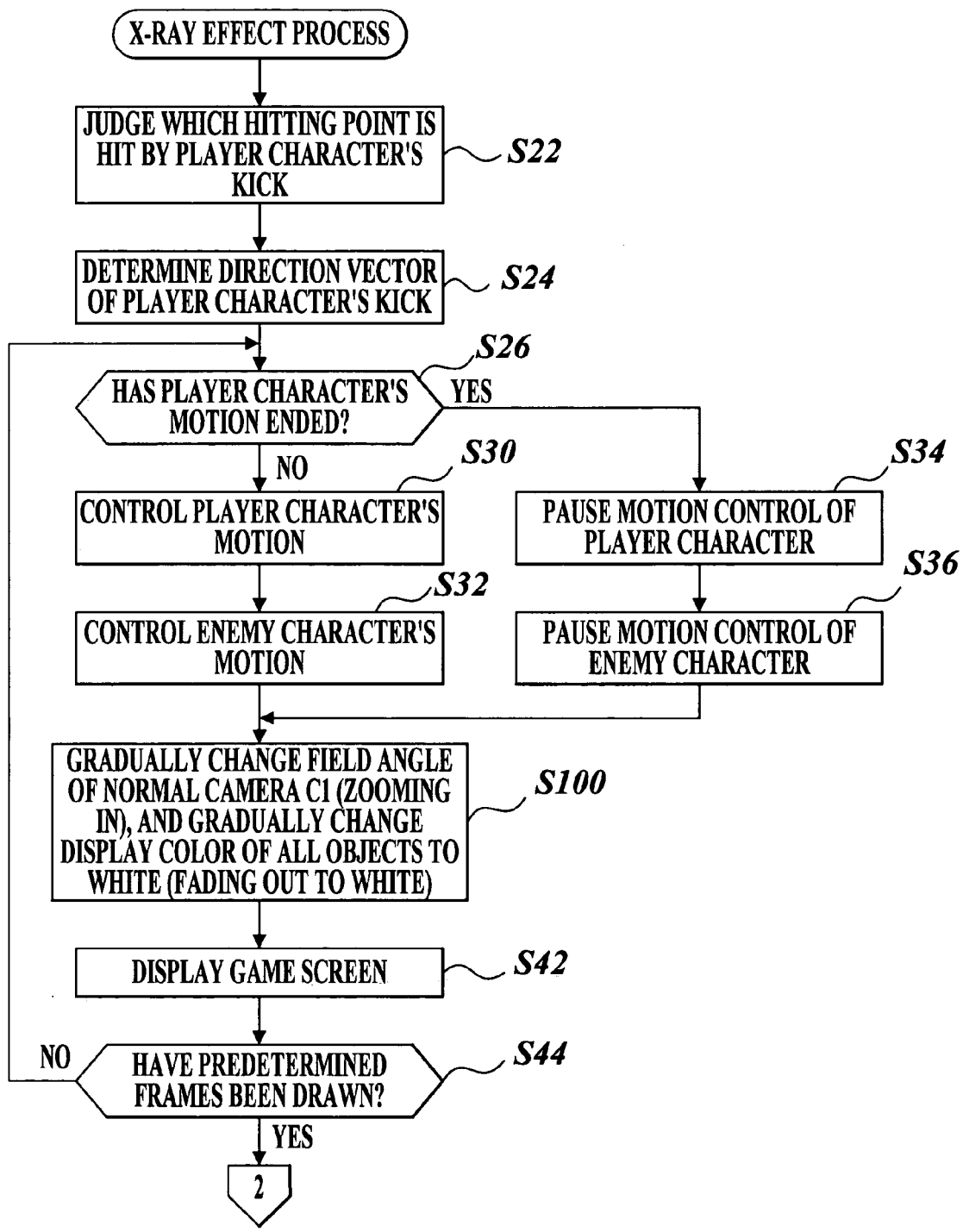
FIG. 19 is a flowchart illustrating a flow of the X-ray effect process in the second embodiment.
Figure 20:
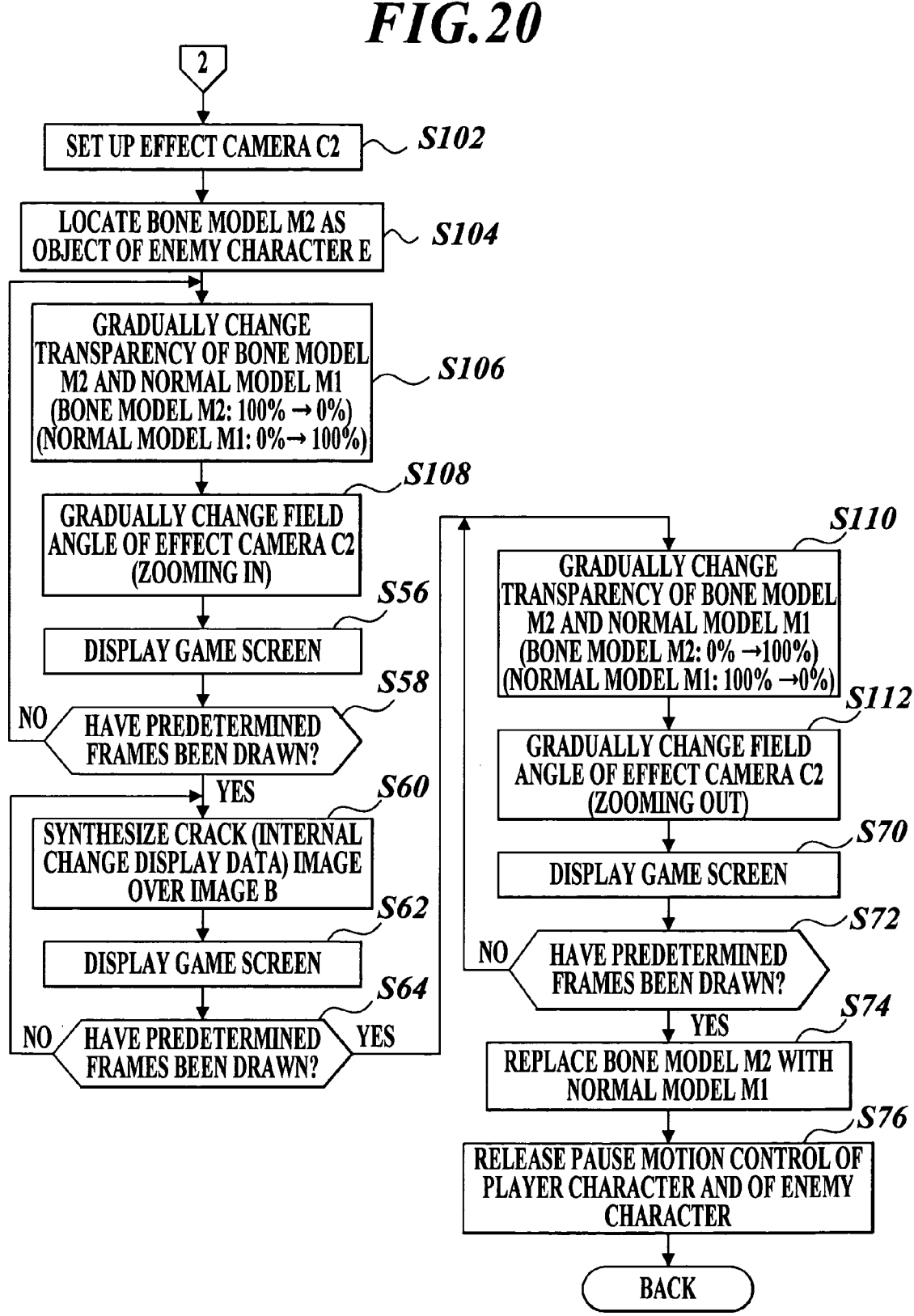
FIG. 20 is a flowchart illustrating the flow of the X-ray effect process in the second embodiment.

FIG. 19 and FIG. 20 are flowcharts for illustrating the flow of the X-ray effect process in the present embodiment.

Compared to the first embodiment, in the flowchart of FIG. 19, step S100 is executed instead of step S40. In other words, in step S100, the viewpoint control unit 224 makes the normal camera C1 view line gradually face towards the hitting point D as much as one drawing frame and zoom in, in compliance with the settings for the first cut of the effect setting information 733. The effect control unit 225 executes fading-out to white by varying the display colors of all objects to a white color.

In the flowchart of FIG. 20, the viewpoint control unit 224 positions the effect camera C2 (step S102) based on the part determination result information 737 and the hitting direction vector information 738. Next, the object control unit 223 positions the bone model M2 as the enemy character E object (step S104). In this case, the bone model M2 is positioned at the same position and same posture as the normal model M1.

Next, the effect control unit 225 varies the degree of transparency of the bone model M2 and normal model M1 (step S106). More specifically, at the first frame of the applying frame number 733h, transparency the bone model M2 is set to 100%, and the transparency gradually decreases as the progression of each drawing frame is made so that the final frame transparency is 0%. Conversely, on the normal model M1, transparency of the first frame is set to 0% and the transparency gradually increases as the progression of each drawing frame is made so that the final frame transparency is 0%. Dissolving is in this way achieved by the effect control unit 225.

The effect control unit 225 changes the field angle of the effect camera C1 little by little up to the field angle setting 733f as the progression of the drawing frame is made, and zooming-in is performed (step S108).

Similarly, in the fourth cut and fifth cut, the effect control unit 225 sets the transparency at the first frame of the applying frame number 733h of the bone model M2 to 0%, and then increases the degree of transparency as the drawing frame progresses so as to reach 100% at the final frame. Conversely, the degree of transparency of the normal model M1 is set to 100% at the first frame, and the degree of transparency decreases as the drawing frame progresses so as to reach 0% in the final frame (step S110). The effect control unit 225 also changes the field angle of the effect camera C2 little by little up to the field angle setting 733f as the drawing frame progresses and zooming-out is performed (step S112).

Third Embodiment

Next, a third embodiment of the present invention is described with reference to FIG. 21A through FIG. 24. The present embodiment can be basically achieved by the same components as those of the second embodiment, except that only a part of the bone model M2 is displayed. Components identical to the first and second embodiments are assigned the same reference numerals, and therefore their description is omitted.

[Description of Function Block]

Figure 21A:
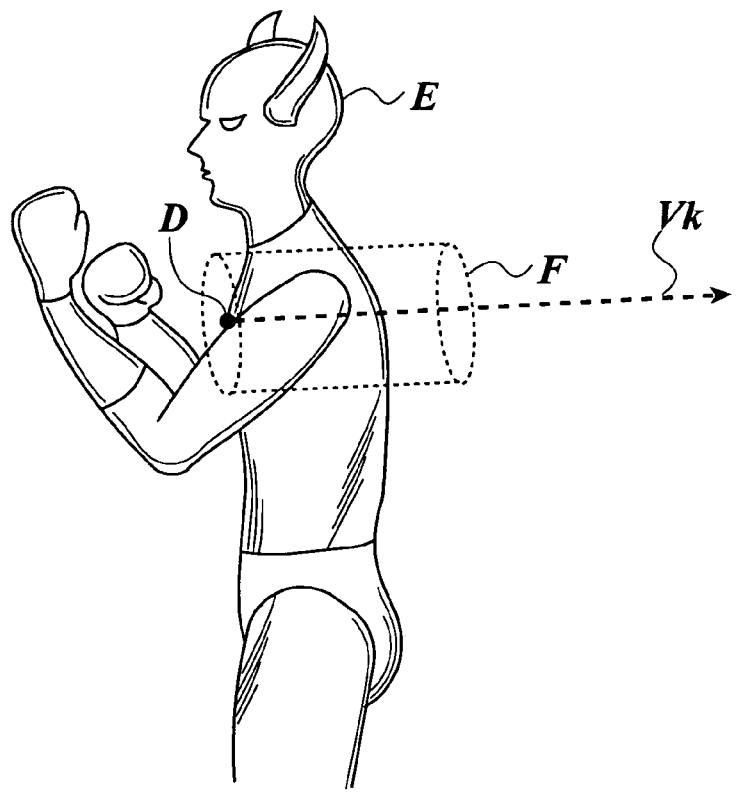
FIGS. 21A and 21B are views showing one example of a predetermined range to be a standard for displaying a part of the model in the third embodiment.
Figure 21B:
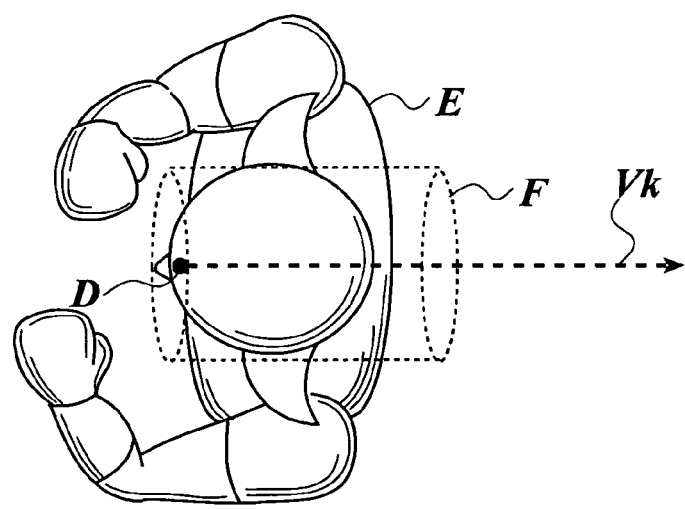

In the present embodiment, when the bone model M2 of the enemy character E is positioned in the virtual space, the object control unit 223 refers to the part determination result information 737 and positions only a part within a predetermined range from the hitting point D. Also when changing the degree of transparency of the normal model M1, the effect control unit 225 only changes a part corresponding to the predetermined range. In the present embodiment, as shown in FIG. 21A and 21B, the predetermined range is set beforehand as a predetermined region F in a column shape along the axis of the hitting direction vector Vk with the hitting point D as the coordinate origin point. A part of the bone model M2 is positioned in this predetermined region F. The predetermined region F is not limited to a column shape, and may for example be set as a shape of rectangular, cylindrical, spherical, cubical, petrosal or otherwise modeled shape, as appropriate.

[Description of Process Flow]

Figure 22:
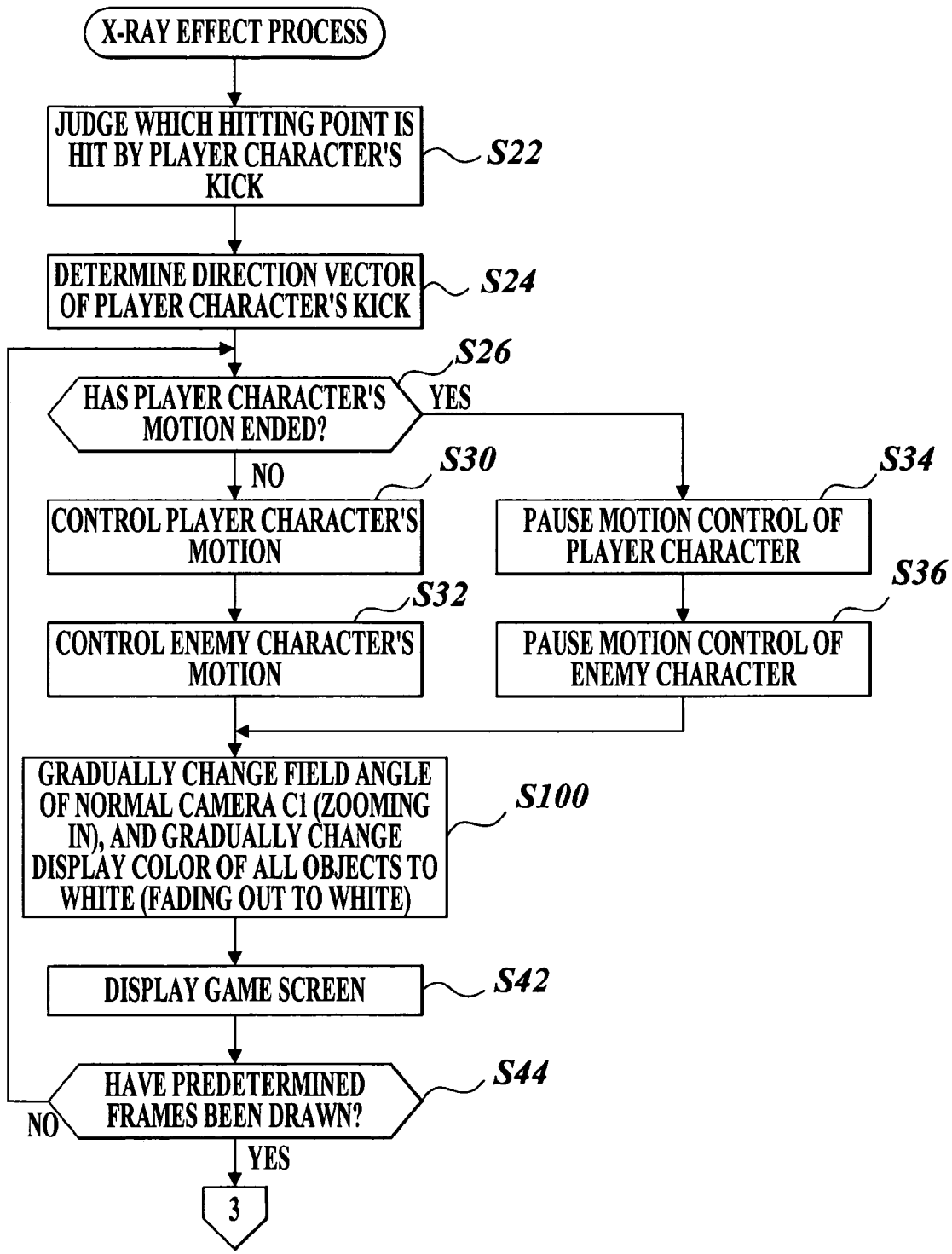
FIG. 22 is a flowchart illustrating a flow of the X-ray effect process in the third embodiment.
Figure 23:
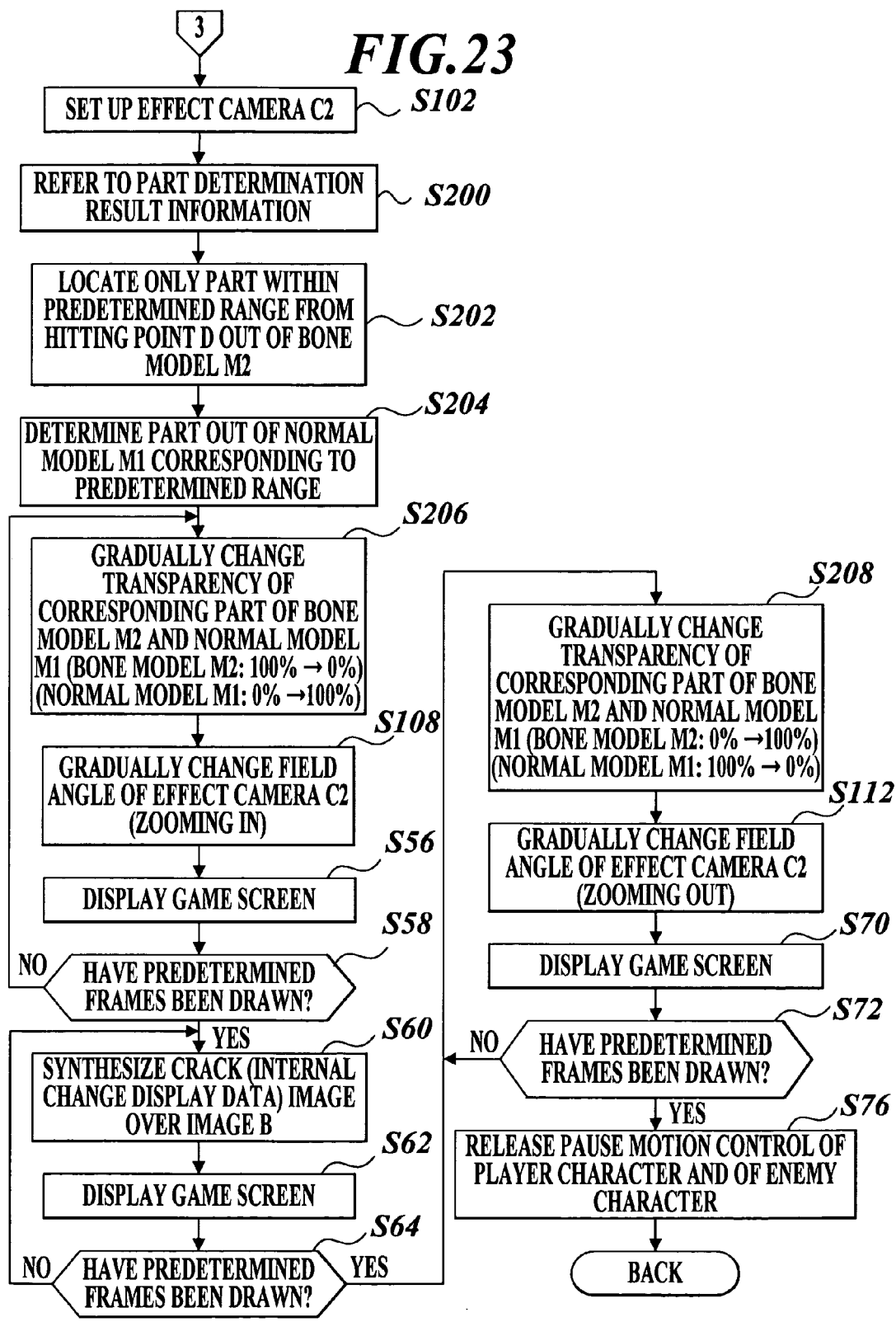
FIG. 23 is a flowchart illustrating the flow of the X-ray effect process in the third embodiment.

FIG. 22 and FIG. 23 are flowcharts for illustrating the flow of the X-ray effect process in the present embodiment.

In FIG. 23, if the viewpoint control unit 224 positions the effect camera C2 in step S102, the object control unit 223 refers to the part determination result information 737 (step S200), and positions only a section of the bone model M2 contained within a predetermined range from the hitting point D (step S202). In this case, the bone model M2 is set in the same posture and the same position as the normal model M1, the same as performed in the second embodiment. In other words, if the hitting point D is in a chest area, a section of the bone model M2 contained within the predetermined range of the chest area is set in a position corresponding to the current posture of the enemy character E.

Next, the effect control unit 225 determines the part of the normal model M1 corresponding to the predetermined range (step S204). Then, the effect control unit 225 changes the degree of transparency of the part on the bone model M2 and the part determined to correspond to the section on the normal model M1 (step 206). More specifically, the effect control unit 225 sets the degree of transparency at the first frame of the applying frame number 733h to 100% at the corresponding part of the bone model M2, and then decreases the degree of transparency as the drawing frame progresses so as to reach 0% at the final frame. Conversely, the degree of transparency on the corresponding part of the normal model M1 increases as the drawing frame progresses so as to reach 100% at the final frame. The effect control unit 225 in this way performs a partial dissolving.

Similarly, in the processes in the fourth and fifth cut, the effect control unit 225 sets the degree of transparency at the first frame of the applying frame number 733h to 0% on the corresponding part of the bone model M2, and the degree of transparency increases as the drawing frame progresses to reach 100% at the final frame. However, the degree of transparency on the normal model M1 is set to 100% at the first frame, and then decreases as the drawing frame progresses, so as to reach 0% at the final frame (step S208).

Figure 24:
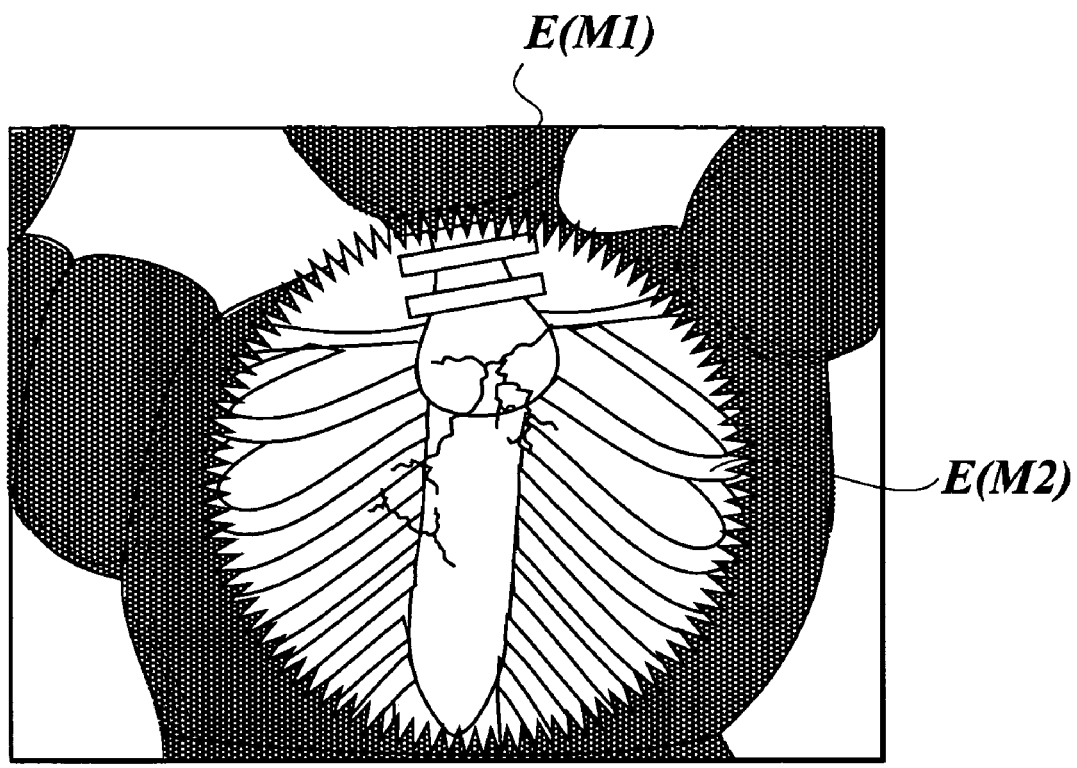
FIG. 24 is a view showing one example of a game screen in the third embodiment.

FIG. 24 is a view showing one example of a game screen in the present embodiment. FIG. 24 shows a part of the bone model M2, dissolving into a part of the normal model M1. As shown in FIG. 24, a section of the enemy character E appears to be transparent as seen on the screen. In this case, achieved is the effect that the processing load in regard to changing the degree of transparency and the degree of transparency when it is drawn is reduced.

Fourth Embodiment

Next, a fourth embodiment of the present invention is described with reference to FIG. 25A through FIG. 32D. The present embodiment describes an example where a thrown ball hits a batter during a baseball game, the so-called dead ball. However, the present invention is not limited to this example and may be similarly applied to a scene in other sports, the scene coming up with a collision such as a hit of an athlete and a soccer ball, a blow by weapon such as a bamboo sword or the like in martial arts such as kendo, etc. The present embodiment can be basically achieved by the same components as in the first through third embodiments. Components identical to the first through third embodiments are assigned the same reference numerals, and therefore their description is omitted.

Figure 25A:
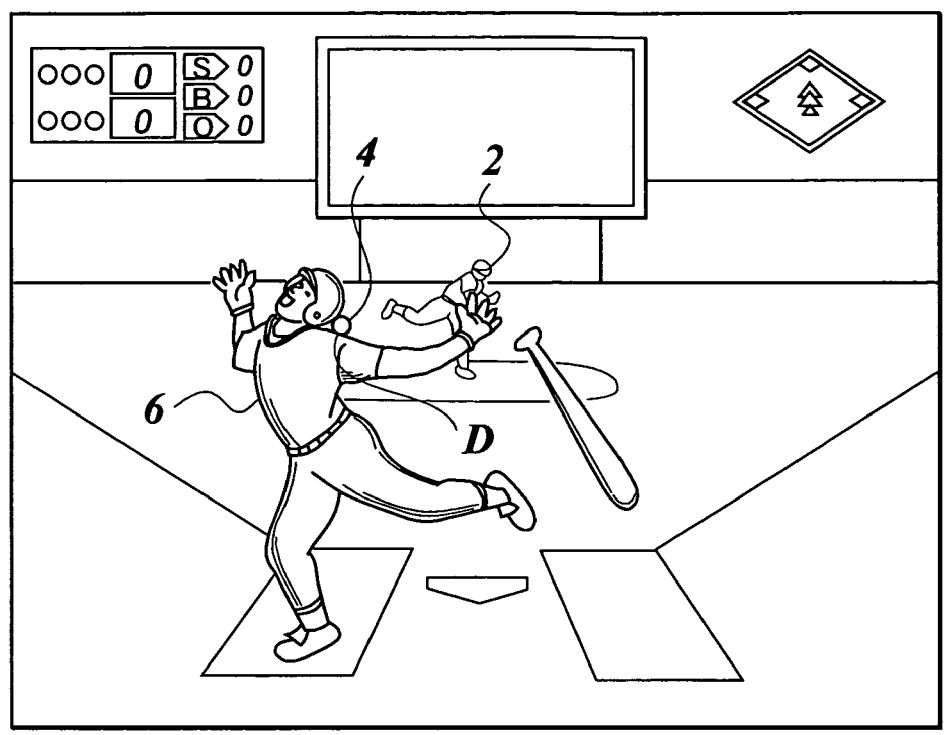
FIGS. 25A and 25B are views showing one example of a game screen in the fourth embodiment.
Figure 25B:
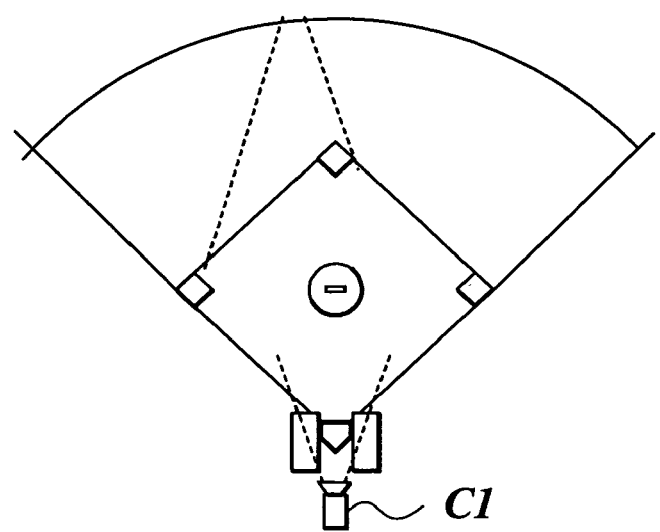

FIG. 25A and 25B are views showing one example of a game screen of the present embodiment. A pitcher character 2 corresponds to the player character P in the first embodiment. A batter character 6 corresponds to the enemy character E in the first embodiment. In other words, a normal display model data 732, an internal structure model data 732*f*, and an internal change display data 732*g* are provided beforehand for the batter character 6.

FIG. 25A and 25B are screens with a normal camera C1 as its viewpoint. The normal camera C1 corresponds to a catcher's view line, or corresponds to a backstop camera position in TV telecast. In the present embodiment, the normal camera C1 is used instead of the effect cameras C2 and C3. In other words, in the present embodiment, the viewpoint control unit 224 changes the posture and the angle of the normal camera C1 to function as the effect cameras C2 and C3, that is, separate effect cameras do not have to be provided.

Also, in the present embodiment, X-ray effect process is used to enhance the visual effect, when the ball 4 misses a strike zone but hits the body of the batter character 6.

[Description of Function Block]

Figure 26:
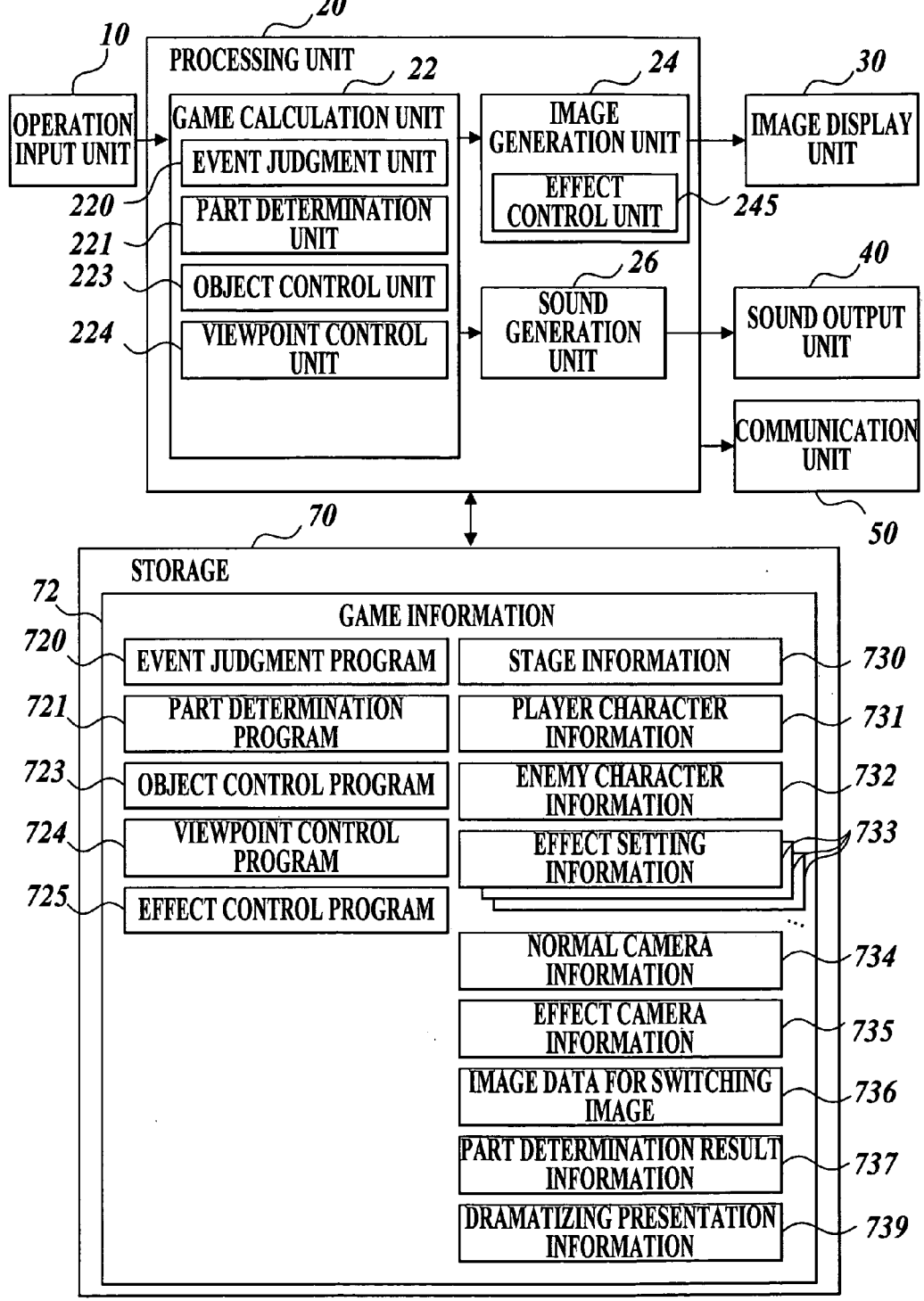
FIG. 26 is a block diagram showing one example of a functional structure of the fourth embodiment.

FIG. 26 is a block diagram showing a functional structure of the present embodiment. In the present embodiment, the game information 72 of the storage 70 includes the dramatizing presentation display information 739 for storing information for an additional display of a text or a dramatizing presentation object in a predetermined shape when performing the X-ray effect process.

More specifically, the dramatizing presentation display information 739 stores text such as "A ball to cost him entire season!!", "Oh no!! My goodness!!" or the like, or stores object modeling data of a word balloon for displaying the text, or display data for two-dimensional synthesis.

FIG. 27 is a view showing one example of effect setting information corresponding to the dead ball in the present embodiment. In the present embodiment, as shown in FIG. 27, a screen shaking effect is performed at the same time with an overlay of the internal change display data 732 in the fourth cut, and a dramatizing presentation object is also displayed in the fifth cut. This screen shaking effect is an effect process to express a shaken state on the screen due to the impact or an effect simulating a shaken state as if from a handheld camera. This screen shaking effect is achieved for example by a method where the viewpoint control unit 224 makes the camera posture or field angle vary with tiny movements, or a method where the effect control unit 245 provides a blurring effect to the image and repeatedly enlarges or reduces it. This shaking of the screen can dramatize the strength of the impact from the blow (in this case, the dead ball).

The effect setting information 733 of the present embodiment is selected according to the progress of the game and is provided beforehand for occasions such as when one has been hit by the ball of his own batting, hit by an item from the stands, or hit by a broken bat.

[Description of Process Flow]

Figure 28:
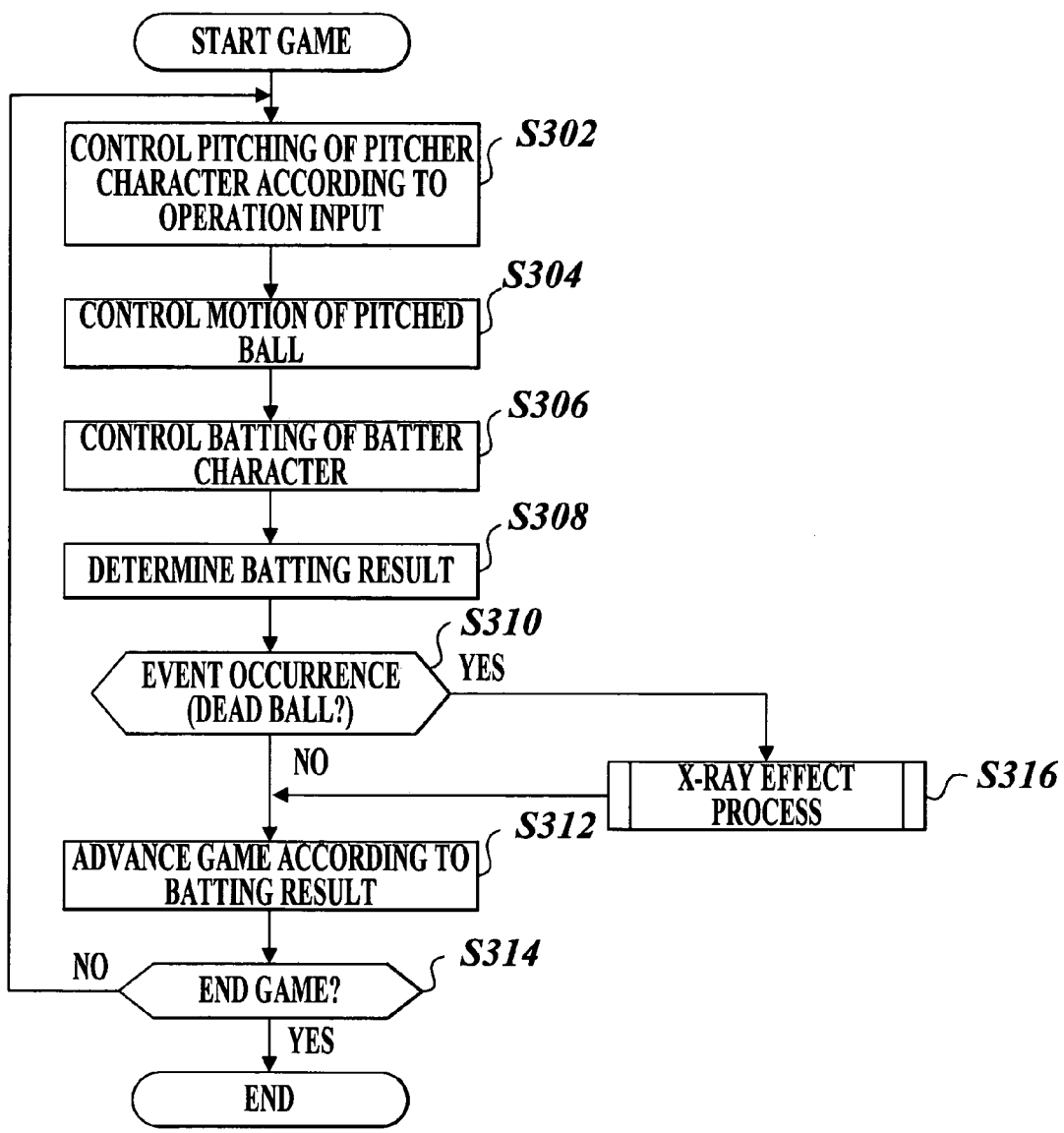
FIG. 28 is a flowchart illustrating the overall flow of the game process in the fourth embodiment.

FIG. 28 is a flowchart for illustrating the overall flow of the game process in the present embodiment. The background of the baseball stadium (game stage) and the placement of fielders in the virtual space are implemented in the same as in the related art. The batter character 6 is displayed as an object of a normal model M1 based on the normal model data 732*e*. Here, the drawing process for the game screens is omitted from the flow. Needless to say, however, images for each predetermined frame are generated with the normal camera C1 as its viewpoint.

As shown in FIG. 28, if the player enters a ball pitching operation, the game calculation unit 22 makes the pitcher character 2 throw the ball (step S302). More specifically, if there is an operation entry from the game controller 1202 for a pitch, the pitcher character 2 is operated according to the predetermined ball pitching motion.

During the pitching motion of the pitcher character 2, motion of the ball 4 is controlled along with that of the fingertips of the pitcher character 2, and after the ball 4 is thrown, the game calculation unit 22 calculates the track according to a type of the ball and strength inputted for the ball pitching path and the ball 4 is moved based on the calculated pitching path (step S304).

If the ball 4 is thrown, the game calculation unit 22 determines the timing for hitting the ball, and the batter character 6 is made to hit the ball 4 according to a predetermined batting motion (step S306).

The event judgment unit 220 judges a result of the batting (step S308) based on the batting timing and track of the ball 4. In other words, the event judgment unit 220 judges from the hit timing and the track of the ball 4, whether or not the ball 4 is to hit another object. If the event judgment unit 220 judges that the ball 4 is to hit an object, the hitting position and hitting conditions are determined and the batting result is determined from the hitting position and hitting conditions.

If the batting result is a result other than a dead ball, for example, a hit, a missed swing or the batter letting the ball go by (step S310; NO), the game calculation unit 22 makes the game advance based on the battering result (step S312) the same as in the conventional game. More specifically, in the case of a missed swing, the ball 4 is controlled according to the track of the ball and the batter character 6 is made to miss the ball during the swing. In the case of a hit, the ball 4 is hit back by the batting of the batter character 6, a defensive screen appears, and the player makes a defensive operation.

If the game progress status satisfies conditions for ending the game (step S314; YES), the game calculation unit 22 ends the game.

On the other hand, if the batting result is a dead ball (step S310; YES), it is determined that a predetermined has occurred, and the game calculation unit 22 performs the X-ray effect process (step S316).

Figure 29:
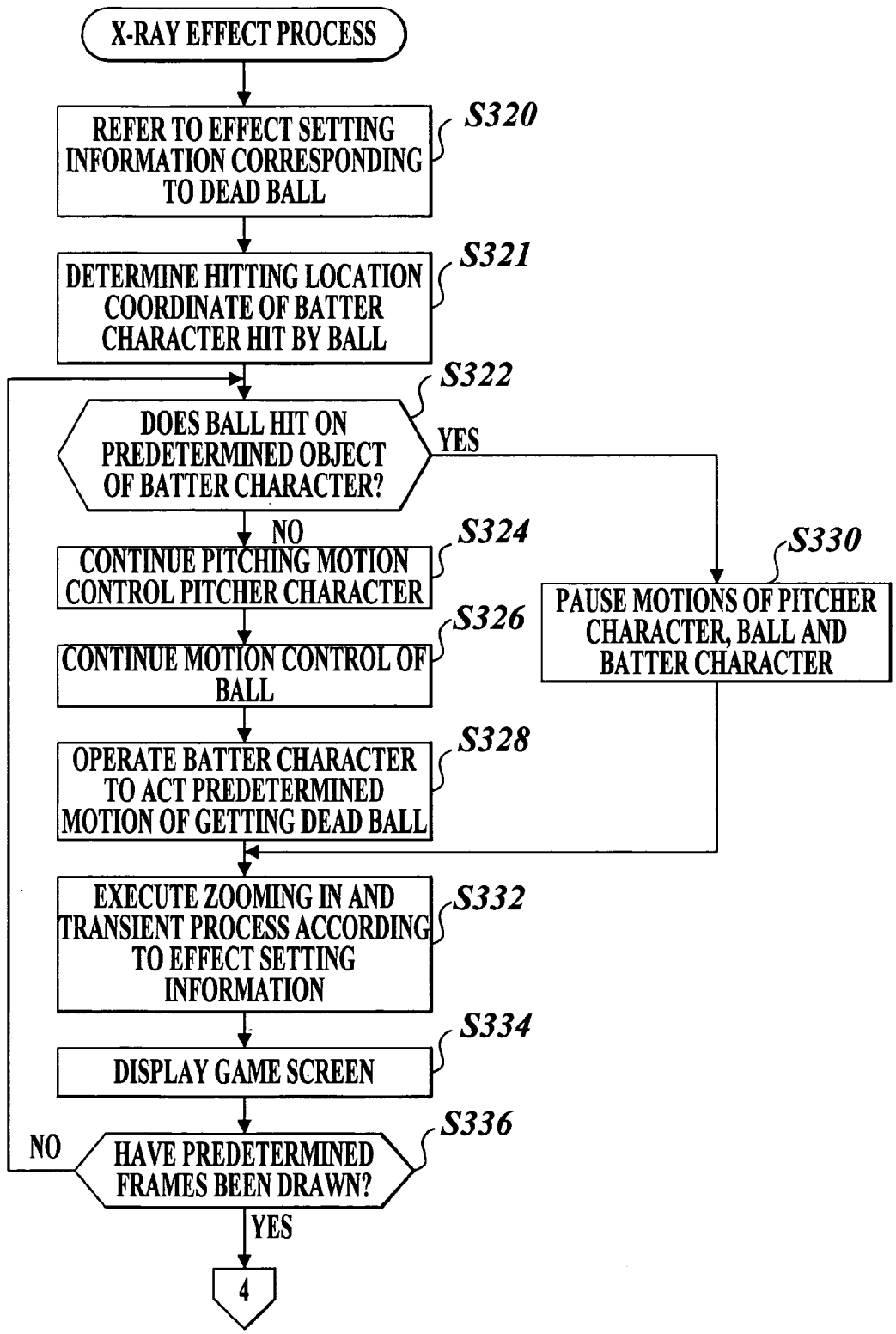
FIG. 29 is a flowchart illustrating a flow of an X-ray effect process in the fourth embodiment.
Figure 30:
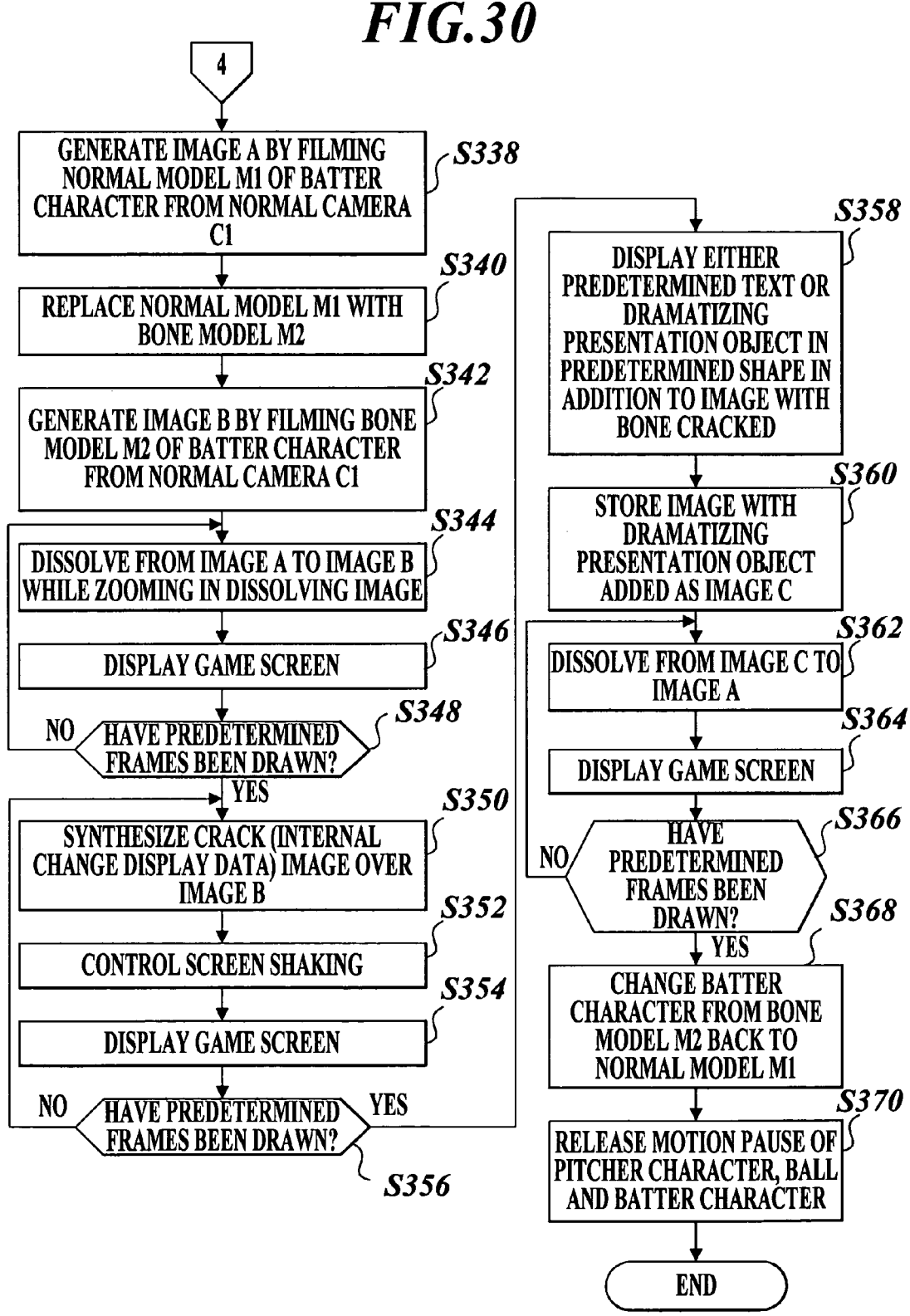
FIG. 30 is a flowchart illustrating the flow of the X-ray effect process in the fourth embodiment.

FIG. 29 and FIG. 30 are flowcharts for illustrating the flow of the X-ray effect process in the present embodiment.

As shown in FIG. 29, first, the game calculation unit 22 refers to the effect setting information corresponding to a dead ball (step S320). Next, the part determination unit 221 decides the hitting location coordinate where the ball 4 hits the batter character 6 (step S321). More specifically, the part determination unit 221 finds the location coordinates for the hitting point D where the ball 4 hits, and stores the coordinate in the part determination result information 737.

Next, the event judgment unit 220 judges whether or not an object of the ball 4 hits on an object of the batter character 6 (step S322).

If the ball 4 does not hit, in other words, when the batting result is already determined and while the ball 4 is moving from the pitcher's mound towards the home base (step S322; NO), the game calculation unit 22 continues the pitching motion of the pitcher character 2 (step S324), and the motion control of the ball 4 continues based on the track of the ball 4 that has already been calculated (step S326). The batting motion of the batter character 6 is terminated, and the batter character 6 is operated according to a predetermined motion of being hit by a dead ball (step S328).

If it is determined that the ball 4 hits the batter character 6 (step S322; YES), the game calculation unit 22 pauses the motion control of the pitcher character 2, the ball 4 and the batter character 6 (step S330).

Next, the viewpoint control unit 224 makes the view line of the normal effect camera C1 gradually face towards the hitting point D as much as one drawing frame while zooming in, according to the settings for the first cut of the effect setting information 733. The effect control unit 245 performs fading-out to white as much as one drawing frame (step S332).

The image display unit 30 displays the game screen with image effects on, the image effects using the normal camera C1 as the viewpoint (step S334). Game screens are generated up to the drawing frame number 733c set in the first cut, and if they are displayed (step S336; YES) shifts to the second cut.

In FIG. 30, the image generation unit 24 generates an image A being the normal model M1 of the batter character 6 as the target with the normal camera C1 as its viewpoint, according to the settings for the second cut of the effect setting information 733, and stores the image in the image data for switching images 736 (step S338).

Next, the object control unit 223 positions the bone model M2 instead of the normal model M1 as the batter character 6 object (step S340). Next, the image generation unit 24, with the normal camera C1 as the viewpoint, generates an image B being the bone model M2 of the batter character 6 as the camera target, and stores the image in the image data for switching images 736 (step S342).

At this step, since images to be dissolved in the second cut and the third cut are prepared, the effect control unit 245 dissolves from image A to image B based on the drawing frame of the applying frame number 733h (step S344).

The image display unit 30 displays an dissolved image showing the internal structure dissolving into an image of the outside of the batter character 6 (step S346). If the game screens are drawn up to the drawing frame number 733c set in the second cut and third cut (step S348; YES), the operation advances to the fourth cut.

In the fourth cut, the effect control unit 245, synthesizes the crack texture of the internal change display data 732g on the game screen using the normal camera C1 as the viewpoint, according to the settings for the fourth cut of the effect setting information 733, for example, by an overlay (step S350). At the time, the viewpoint control section 224 changes the roll and field angle of the normal camera C1 to display the screen shaking (step S352). In this case, at the end of the fourth cut, the settings such as for the camera posture and the field angle relating to screen shaking for the normal camera C1 by the viewpoint control unit 224 are returned to their default settings, which are prior to executing the screen shaking.

The image display unit 30 then displays an image of bones with cracks added on as the game screen (step S354). If the game screens are drawn up to the drawing frame number 733c set in the fourth cut (step S356; YES), the operation advances to the fifth cut.

In the fifth cut, the effect control unit 245 adds a display of a dramatizing presentation object in a predetermined shape or of a predetermined text, to the image having the bones with the crack added on (step S358). In the present embodiment, the effect presentation object with text such as "A BALL TO COST HIM ENTIRE SEASON!!" in a word balloon, is added for the purpose of showing the impact degree of the dead ball. The effect control unit 245 then stores the image with the dramatizing presentation object displayed additionally on, in the image switching data 736 as an image C (step S360).

Next, the effect control unit 245 executes dissolving process from the image C in the drawing frame of the applying frame number 733h to the image A (step S362), according to the settings for the fifth cut and sixth cut of the effect setting information 733. The image display unit 30 then displays a game image of the enemy character E's bone with the crack added, dissolving into the external image of the enemy character E (step S364).

Then, if the game screens are drawn up to the drawing frame 733c set in the fifth and sixth cuts (step S366; YES), the object control unit 223 brings the batter character 6 object from the bone model M2 back to the normal model M1 (step S368). The game calculation unit 22 releases the motion pauses of the batter character 2, ball 4 and batter character 6 (step S170), and ends the X-ray effect process.

[Description of Sample Screens]

FIG. 31A through FIG. 32D are views showing one example of screens in the displaying order according to the X-ray effect process of the present embodiment.

FIG. 31A, 31B, 31C and 31D are views of screens corresponding to the first cut through the fourth cut. FIG. 31A shows the start of the motion of the batter character 6 being hit by the dead ball. FIG. 31A also fades out to white while zooming in towards the hitting point D.

At the time that the screen switches to a single color of white, the screen is switched to FIG. 31B, which corresponds to screen A of the second cut. Next, FIG. 31B zooms in even further and dissolves, to be switched to FIG. 31C, corresponding to screen B of the third cut. At this step, an image of the bones (internal structure) of the batter character 6 is displayed. Then, FIG. 31D shows a display as the fourth cut with cracks appearing in the bones, and the screen is given a shaking effect to give the impression of cracks appearing from the impact of the dead ball.

FIG. 32A, 32B, 32C and 32D are views of screens corresponding to the fifth through seventh cuts and back to the normal game screen.

Figure 32A:
FIGS. 32A, 32B, 32C and 32D are views continued from FIGS. 31A, 31B, 31C and 31D showing one example of the screen display sequence according to the X-ray effect process in the displaying order in the fourth embodiment.
Figure 32B:
Figure 32C:
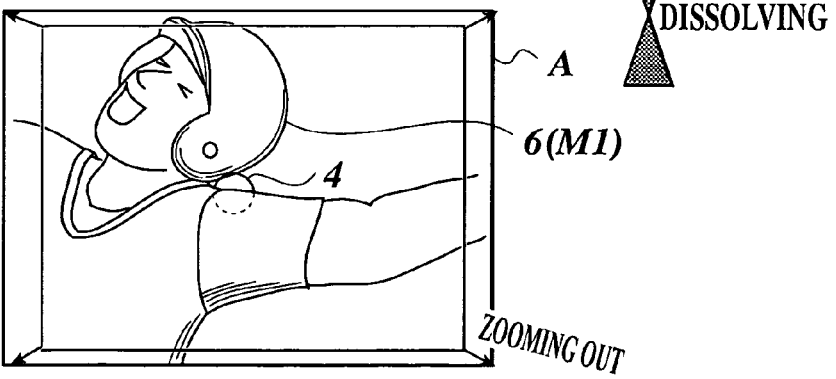
Figure 32D:
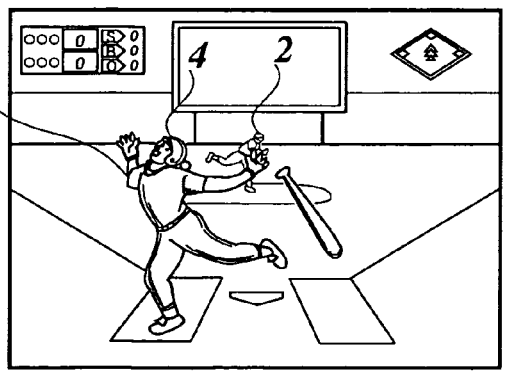

As shown in FIG. 32A, the image with cracks in the bones has an additional display of a dramatizing presentation object 9 with a text 8 written in. FIG. 32A corresponds to the previously described screen C. The screen zooms out from screen C of FIG. 32B while dissolving, and is switched to screen A of the seventh cut in FIG. 32C with ending the X-ray effect. The screen then returns to the normal game screen as shown in FIG. 32D with the normal camera C1 as its viewpoint.

As mentioned, in the present embodiment, a dead ball is described as an example. However, the X-ray effect can be executed for a diverse range of effects, by referring to the effect setting information 733 in step S320, according to the state for example of one hit by the ball of his own batting.

The X-ray effect process is not limited to being executed during a normal game play, but may, for example, be executed only during the replay. More specifically, when it is judged whether or not an event occurs in step S310, a judgment can be made on whether or not it is a replay screen as well, and then it is branched to step S316 only in the case of the replays, and the X-ray effect process is executed.

[Description of Adaptations]

As mentioned, the embodiments of the present invention are described. However, the application of the present invention is not limited to the description above. In regard to the present invention, a component may be suitably added, deleted and modified without departing from the scope of the essence of the present invention.

The internal structure of the enemy character E and the batter character 6 for example are not limited to a bone structure but may be internal organs or muscle, or concealed items hidden in the chest. Also, when the enemy character E is not set to have an internal bone, for example a case of machines such as robots, automobiles or the like, an internal structure may be an internal mechanism.

Damage to the internal structure is shown by synthesizing a crack texture. However, the bone model M2 may be composed of a plurality of parts and displayed with a motion such as a breaking motion or the like.

Conditions for judging the occurrence of an event to which the X-ray effect process is applicable are an attack by the player character P. However, the occurrence of an event may be aligning the sights of a scope capable of viewing an interior in a transparent state. In that case, the position of the sights on the scope corresponds to the impact position D.

In the X-ray effect process, the motion of objects such as the enemy character E and the batter character 6 are paused. Needless to say, however, the X-ray effect process can be executed during a series of motion without having to pause the movement.

The entire disclosure of Japanese Patent Application No. Tokugan 2003-079906 filed on Mar. 24, 2003 including specification, claims, drawings and summary are incorporated herein by reference in its entirety.

What is claimed is:

1. A game performing method for making a computer device execute a predetermined game by generating a first object and a second object as seen from a virtual camera, comprising:
   judging whether there is a hit between the first object and the second object;
   judging whether a predetermined event occurrence condition is satisfied if it is judged that there is the hit between the first object and the second object;
   generating a first image which is an internal structure object of the second object if it is judged that the predetermined event occurrence condition is satisfied; and
   generating a second image which is the internal structure object with a predetermined part thereof changed after the first image is generated.

2. The method as claimed as claim 1, further comprising:
   determining a hitting location between the first object and the second object; and
   setting the virtual camera so as to make a field angle thereof include the determined hitting location if it is judged that the predetermined event occurrence condition is satisfied,
   wherein the generating the first image includes generating the first image which is the internal structure object of the second object based on the set virtual camera; and
   the generating the second image includes generating the second image which is the internal structure object with the predetermined part thereof changed after the first image is generated.

3. The method as claimed in claim 2, further comprising making the computer device function for generating an image of the second object having a posture that is the same as a posture in the internal structure object at completion of generating the first image and the second image, as seen from the set virtual camera.

4. The method as claimed in claim 3 wherein
   the generating the second image includes generating the second image so as to gradually increase transparency of the internal structure object;
   the generating the image of the second object includes generating the image of the second object so as to gradually decrease transparency of the second object from a second transparency degree; and
   the making the computer device function includes making the computer device function for controlling to switch to the generated image of the second object while overlapping the image of the second object on the second image.

5. The method as claimed in claim 3, wherein the making the computer device function includes making the computer device function for controlling to generate an image while applying a single color display effect for gradually changing the entire image into a single color.

6. The method as claimed in claim 2, further comprising:
   making the computer device function for generating an image of the second object as seen from the set virtual camera,
   wherein the generating the first image and the generating the second image include generating sequentially the first image and the second image after the image of the second object is generated.

7. The method as claimed in claim 6, wherein the generating the first image and the generating the second image include generating the first image and the second image each having the internal structure object with a posture that is the same as a posture in the second object when the image of the second object is generated.

8. The method as claimed in claim 6, wherein the generating the first image and the generating the second image include generating the first image and second image by making an image of a predetermined part out of the generated image of the second object become a part in the internal structure object, the part corresponding to the predetermined part.

9. The method as claimed in claim 8, wherein the predetermined part includes a predetermined range from the hitting location.

10. The method as claimed in claim 6, wherein
    the generating the image of the second object includes generating the image of the second object so as to gradually increase transparency of the second object;
    the generating the first image includes generating the first image so as to gradually decrease transparency of the internal structure object from a first transparency degree; and
    the making the computer device function includes making the computer device function for controlling to switch to the generated first image while overlapping the first image on the image of the second object.

11. The method as claimed in claim 1, further comprising making the computer device function for determining a hitting location between the first object and the second object and for generating an image with a zoom-up applied on, the zoom-up being made so as to bring the virtual camera close to the determined hitting location, if it is judged that the predetermined event occurrence condition is satisfied.

12. The method as claimed in claim 1, further comprising making the computer device function for generating an image with a screen shaken when the second image is generated.

13. The method as claimed in claim 1, further comprising making the computer device function for adding a text or a dramatizing presentation object on the second image.

14. The method as claimed in claim 1, further comprising:
    making the computer device function for controlling to display a replay screen, wherein the predetermined event occurrence condition includes that the displaying the replay screen is controlled.

15. The method as claimed in claim 1, further comprising:
making the computer device function for pausing a motion of the first object and a motion of the second object if it is judged that the predetermined event occurrence condition is satisfied;
wherein the generating the first image and the generating second image include generating the first image and the second image after the motion of the first object and the motion of the second object are paused; and
after the first image and the second image are generated, the computer device is made to function for resuming the motion of the first object and the motion of the second object that are paused.

16. The method as claimed in claim 15, further comprising making the computer device function for switching to the generated first image while applying a single color effect for gradually making an entire image into a single color, the entire image of the first object and the second object whose motions are paused.

17. An information storage medium readable by a computer device, storing the method as claimed in claim 1.

18. A data signal embodied in a carrier wave, comprising information used for executing the method as claimed in claim 1.

19. A program, when the program is loaded onto an operating device, the program making the operating device execute the method as claimed in claim 1.

20. A game device for executing a predetermined game by generating an image of a first object and an image of a second object as seen from a virtual camera, comprising:
an hitting judgment section for judging whether there is a hit between the first object and the second object;
an event judgment section for judging whether a predetermined event occurrence condition is satisfied if the hitting judgment section judges that there is the hit; and
an internal structure image generating section for generating a first image which is an internal structure object of the second object if the event judgment section judges that the predetermined event occurrence condition is satisfied, and for generating a second image which is the internal structure object with a predetermined part thereof changed after the first image is generated.

* * * * *